(12) United States Patent
Matsumura et al.

(10) Patent No.: US 8,406,408 B2
(45) Date of Patent: Mar. 26, 2013

(54) CALL CONTROL SYSTEM AND CALL CONTROL METHOD

(75) Inventors: Jun Matsumura, Tokyo (JP); Takahito Matsushima, Tokyo (JP)

(73) Assignee: BizMobile Inc., Tokyo (JP)

( * ) Notice: Subject to any disclaimer, the term of this patent is extended or adjusted under 35 U.S.C. 154(b) by 208 days.

(21) Appl. No.: 12/995,538

(22) PCT Filed: Jun. 1, 2009

(86) PCT No.: PCT/JP2009/060006
§ 371 (c)(1),
(2), (4) Date: Dec. 1, 2010

(87) PCT Pub. No.: WO2009/148025
PCT Pub. Date: Dec. 10, 2009

(65) Prior Publication Data
US 2011/0075831 A1    Mar. 31, 2011

(30) Foreign Application Priority Data
Jun. 2, 2008 (JP) ................ 2008-145001
Jul. 29, 2008 (JP) ................ 2008-195497

(51) Int. Cl.
*H04M 3/42* (2006.01)
(52) U.S. Cl. ............................. 379/210.01
(58) Field of Classification Search ........... 379/210.01
See application file for complete search history.

(56) References Cited

U.S. PATENT DOCUMENTS
7,822,186 B1 * 10/2010 Boni ................ 379/210.01

FOREIGN PATENT DOCUMENTS

| | | |
|---|---|---|
| JP | 01-280952 A | 11/1989 |
| JP | 2002185656 A | 6/2002 |
| JP | 2004056522 A | 2/2004 |
| JP | 2005223936 A | 8/2005 |
| JP | 2006033448 A | 2/2006 |
| JP | 2006229964 A | 8/2006 |
| WO | 2004077804 A1 | 9/2004 |

OTHER PUBLICATIONS

International Search Report dated Jun. 30, 2009 in corresponding international patent application No. PCT/JP2009/060006, 2 pages.

* cited by examiner

*Primary Examiner* — Alexander Jamal
(74) *Attorney, Agent, or Firm* — Maier & Maier PLLC

(57) ABSTRACT

A call control system for connecting to a callee from a caller for phone call including a connection request receive section for receiving a connection request contains a telephone number of a telephone terminal of the caller and a telephone number of a telephone terminal of the callee from the caller to the callee, from an information terminal equipment of the caller. A call callee section for calling to the telephone terminal of the callee, and settles a callee voice call session to the telephone terminal of the callees a-call caller section for calling to a telephone terminal of the caller, and settling a caller voice call session to a telephone terminal of the caller after the callee voice call session is settled.

12 Claims, 16 Drawing Sheets

(a)

(b)

CALL CONTROL SYSTEM AND CALL CONTROL METHOD

RELATED APPLICATIONS

This application is the U.S. national stage application of International Patent Application No. PCT/JP2009/060006, filed on Jun. 1, 2009, which claims benefit of priority to Japanese Patent Application No. 2008-145001, filed on Jun. 2, 2008 and Japanese Patent Application No. 2008-195497, filed on Jul. 29, 2008, the disclosures of which are incorporated by reference herein in their entireties.

TECHNICAL FIELD

The present invention relates to the telephone call control system and call control method which provide a variegated voice communication mode to a caller and a callee.

BACKGROUND ART

Recent years, the Internet telephone via an IP network is popularizing. By using the Internet telephone, the communications network of low cost can be used and the various services adapting the flexibility of the IP network can be provided. In the patent document 1, the service which settles each other the session which went via the IP network depending on the connection request to a callee from the caller via an IP network from IP call management server which performs call management of the terminal in an IP network is disclosed.

In detail, in the patent document 1, first, if a connection request is received from the operation terminal of a caller, a call request to the telephone terminal of the caller described during the connection request will be performed, the 1st session is settled between IP call management server and the 1st telephone terminal, a call request to the telephone terminal of a callee is sent, the 2nd session is settled between IP call management server and the 2nd above-mentioned telephone terminal. Next, the voice telephone call between the 1st telephone terminal and the 2nd telephone terminal can be performed via the 1st session and 2nd session by bridge of the 1st session and 2nd session.

In addition, according to the call control method described in patent document 1, telephonic communications with the telephone call place made into the purpose on the information screen acquired via the communication line network can be performed simply and safely.

Further, in the Internet telephone, for example, the various telephone call control services which make a group from a plurality of users, carry out a call all at once to the member of this group, or connect the channel for a simultaneous telephone call are provided. As one of the telephone call control service of this, in patent document 2, the system which the group which comprised a plurality of users provides with a conference call by the simultaneous telephone call is disclosed.

In the system disclosed by the patent document 2, the telephone number of the request side user as call people of a conference call is made to match and memorize the telephone number of other users as a participant at a conference call, to the call from the telephone terminal by the side of a request, when other users answer, a plurality of channels are set up and a conference call is materialized.

Prior Art Literature
Patent document 1: Japanese Patent Published Application No. 2006-33448,A
Patent document 2: Japan patent No. 3950379

SUMMARY OF THE INVENTION

Technical Problem

However, in using the call control method of the patent documents 1, diversification of service is attained and a user's convenience is required. For example, when the telephone terminal of a callee has receipt from the server, a callee does not always answer because of a callee being unable to notice or being busy etc.

Moreover, even though a user wants to carry out a call, when the user cannot telephone at the moment, when the user can telephone now in the future, if the user can make the phone call, without forgetting, the convenience of a caller will go up. Further, if a callee can know the priority of the call when receipt comes to the telephone terminal of a callee, the callee can decide whether it answers immediately and the convenience of a callee goes up it.

In addition, with the service disclosed by the patent documents 2 mentioned above, in order that the channel to each participant is set up based on the telephone number of the caller to convene, a participant will be informed of the telephone number of a caller, there is a problem of security, such as protection of personal information. Further, in the case as the caller to convene has registered a plurality of conference rooms, because a common telephone number will be used for the call of all the conference rooms, the called participant will get confused because he cannot distinguish the call from which conference room.

The present invention has been made in the circumstances as described above, and it is object of the present invention to overthrow the fixed concept that the caller must immediately dial when telephoning, and the callee must be in the situation which can answer it, and the present invention makes time for users to talk over the telephone schedule freely. As a result, the diversity of service is raised and a user's convenience is raised.

Moreover, in cases where it connects with the groups to which a plurality of users belong, such as a conference call and customer service, by operation of a caller, it is object of the present invention to provide the system and the method of raising security, such as protection of the personal information on the caller, and also raising the convenience of the called callee of providing call control system and call control method.

Solution to Problem

In order to accomplish the object as described above, the present invention provides, a call control system for connecting to a callee from a caller for phone call comprising: a connection request receive section for receiving a connection request contains a telephone number of a telephone terminal of the caller and a telephone number of a telephone terminal of the callee from the caller to the callee, from an information terminal equipment of the caller; a call callee section for calling to the telephone terminal of the callee, and settles a callee voice call session to the telephone terminal of the callees a-call caller section for calling to a telephone terminal of the caller, and settling a caller voice call session to a telephone terminal of the caller after the callee voice call session is settled; and a bridge processing section settling a voice call between the telephone terminal of the caller, and the telephone terminal of the callee by bridge of the callee voice call session and the caller voice call session.

Moreover, other invention provides a call control method for connecting to a callee from a caller for phone call comprising:

(1) receiving a connection request contains a telephone number of a telephone terminal of the caller and a telephone number of a telephone terminal of the callee to the callee from the caller, from information terminal equipment of the caller;

(2) calling to the telephone terminal of the callee, and settles a callee voice call session to a telephone terminal of the callee;

(3) calling to the telephone terminal of the caller, and settling a caller voice call session to a telephone terminal of the caller after the callee voice call session is settled; and (4) settling a voice call between a telephone terminal of the caller, and a telephone terminal of the callee by bridge of the callee voice call session and the caller voice call session.

According to the present invention, when caller carries the call request, after the callee voice call session with callee is settled, the caller voice call session with caller will be settled, both voice call sessions are bridged. Therefore, while the situation where the session was settled is held up, caller answered the receipt from the call service server does not need to wait for the response of callee. By this cause, the convenience of the call control system will advance for the caller.

In addition, preferably, above invention wherein the connection request contains the call reservation time to start the call processing to the callee, and a reservation call processing section for executing the call to the telephone terminal of the callee, and settles the callee voice call session to the telephone terminal of the callee at the telephone call reservation time is connected to the call callee section.

In this case, when caller carries the call request by the telephone call reservation appointed time, the call will be separately carried to the cellular phone of caller, and the telephone of callee at the reserved date. And after each voice call session is settled, both the voice call session are bridged. Therefore, when caller needs to telephone the callee in the future, the telephone call is executed, without being forgotten. By this cause, the convenience of the call control system will advance for the caller.

Preferably, in the above invention wherein the connection request includes specification of a priority of call processing to the callee, the callee call section is connected: a plurality of communication terminals to which a telephone number is each assigned for the call; and a priority processing section for calling to the telephone terminal of the callees according to the correspondency of the priority set previously and the telephone number from the communication terminal to which the telephone number corresponding to the appointed priority is assigned, and settling a callee voice call session between the communication terminal, and the telephone terminal of the callee.

In this case, in order that there is the call from the telephone number according to the priority appointed by the caller which is the sending agency, callee can know the degree of importance of the telephone call by confirming the call from which telephone number it is at the time of receipt. Therefore, the callee can decide whether it should answer immediately to the receipt, and its convenience of the callee will advance.

Further, the present invention provides a call control system for connecting with a group constituted by a plurality of users depending on operation of a caller comprising: a user database for storing a telephone number for calls peculiar to the group, and a telephone number of a telephone terminal of a callee as a user belonging to this group after associating them; a connection request receiving section for receiving a connection request required to the callee including the calling telephone number and a telephone number of a telephone terminal of the callee from information terminal equipment of the caller; a callee call section for calling of the calling telephone number to a telephone terminal of the callee as a telephone number of a caller, and settling one or more callee voice call sessions to a telephone terminal of the callees a-caller call section for dialing the calling telephone number to a telephone terminal of the caller as a telephone number of a caller, and settling a caller voice call session settle to a telephone terminal of the caller, after the at least one callee voice call session is settled; and a bridge processing section for settling a voice call between a telephone terminal of the caller, and a telephone terminal of the callee by bridge of the one or more callee voice call sessions and the caller voice call session.

Moreover other invention provides a call control method for connecting with a group constituted by a plurality of users depending on operation of a caller comprising:

(1) storing previously, in association with each other, calling telephone number peculiar to the group, and a telephone number of a telephone terminal of a callee belong to the group in a user database after associating them;

(2) receiving a connection request required to the callee including the calling telephone number and a telephone number of a telephone terminal of the callee from information terminal equipment of the caller;

(3) dialing the calling telephone number to a telephone terminal of the callee as a telephone number of a caller, and settling one or more callee voice call sessions settle to a telephone terminal of the callee;

(4) dialing the calling telephone number to a telephone terminal of the caller as a telephone number of a caller, and settling a caller voice call session settle to a telephone terminal of the caller, after the at least one callee voice call session is settled; and (5) settling a voice call between a telephone terminal of the caller, and a telephone terminal of the callee settle by bridging the one or more callee voice call sessions and the caller voice call session.

According to these inventions, For example, in cases where the participant at the conference call is made into the group, when the call person (caller) of the meeting carries the call request, after the callee voice call session to the participant (callee) called to the conference room is settled, the caller voice call session with the caller is settled, and he is trying to bridge both the voice call session.

In order to convene the participant particularly using calling telephone number indigenous to each conference room, the call person's telephone number is not known by the participant. In order that calling telephone number is indigenous to each conference room, by informing and convening calling telephone number, the participant can know previously whether which conference room is convening.

Preferably, above invention, wherein the connection request contains the call reservation time to start the call processing to the callee, and a reservation call processing section for executing the call to a telephone terminal of the callee at the call reservation time is connected to the callee call section. In this case, when the caller which is the call person carries the call request by the telephone call reservation which appointed the date, the caller and the callee call separately for the call of the conference room to the reserved date. Therefore, while the call person is scheduling the meeting in the future, it can carry out, without forgetting the call.

Preferably, above invention, wherein the callee call sections perform call processing all at once to telephone terminals of a plurality of callees belonging to the group, and makes the callee voice call session settle only to a telephone terminal of a callee who answered first. In this case, for example, calling telephone number is set up for every classification of the support in the customer service center, the user of the caller does not need to continue waiting for the response of the operator by telephoning the calling telephone number according to the classification of the support to request. And then, according to this invention, in order that a caller voice call session to a caller settled and bridge processing section bridge between both the voice call session, after a callee voice call session to an operator which answered earliest by calling simultaneously to all operator used as callee is settled, once a user of a caller sends to a telephone number of arbitrary supports, he does not have to continue doing a call and should just wait for a call-back when an operator answers until an operator answers.

ADVANTAGEOUS EFFECTS OF INVENTION

According to the present invention, the session of the session with the caller and callee which were each settled separately is bridged, in the call control system which realizes the voice call with the callee the communicating agency, time over the telephone can be scheduled freely, diversity of service can be planned by this cause, and the user's convenience can be raised.

According to the present invention, when making connection with the group who consists of a plurality of users, such as the conference call and customer service, depending on operation of the caller, Security, such as protection of the personal information on the caller, can be raised, the convenience of the callee called can also be raised.

DESCRIPTION OF EMBODIMENTS

Figure 1:
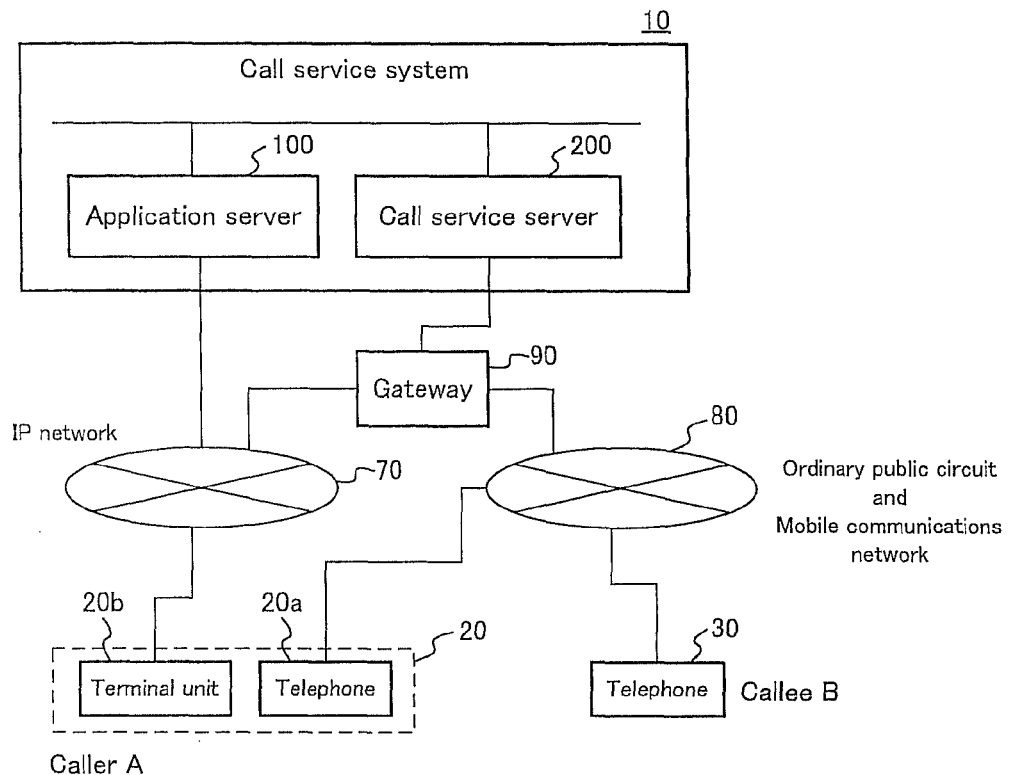
[FIG. 1] A block diagram showing the network containing the call service system.

An embodiment of the present invention is explained in detail with reference to drawings. FIG. 1 is a block diagram showing a structure of a network system containing the call service system 10 to which the present invention is applied. As shown in FIG. 1, the call service system 10 is provided with the application server 100 and the call service server 200, connected with IP network 70, and connected to an ordinary public circuit and the mobile communications network 80 by the gateway 90.

At this point, IP network 70 is a network which performs information transmission by the Internet protocol, and is the Internet typically. An ordinary public circuit and the mobile communications network 80 are general terms for a telephone line which performs voice calls, such as a landline and mobile communications. The gateway 90 performs processing which does an interconversion of data format, the protocol, etc., in order to enable interactive communication with IP network 70, and an ordinary public circuit and a mobile communications network 80.

In an example of the figure, a case where caller A telephones to callee B using a service provided from the call service system 10 is shown. Caller A can use the terminal unit 20b which has an IP network connection function and a web browser function, and the telephone 20a which has an ordinary public circuit and a mobile communications network connection function, in this example, the user A uses the cellular phone 20 which has the terminal unit 20b and a function of a both of the telephone 20a. Accordingly, the cellular phone 20 has a telephone function of mobile communications, and a function which accesses a Web page by IP network 70 is added. Callee B uses the telephone 30 has an ordinary public circuit and a mobile communications network connection function. A landline and a mobile radiotelephone can be used as the telephone 30.

Figure 2:
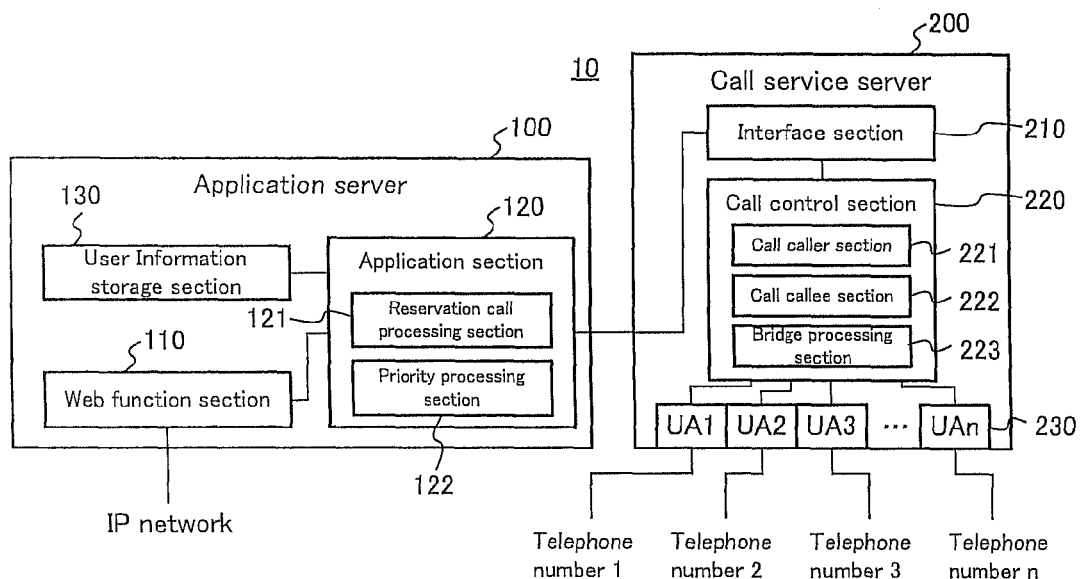
[FIG. 2] A block diagram showing the functional constitution of the call service system.
Figure 3:
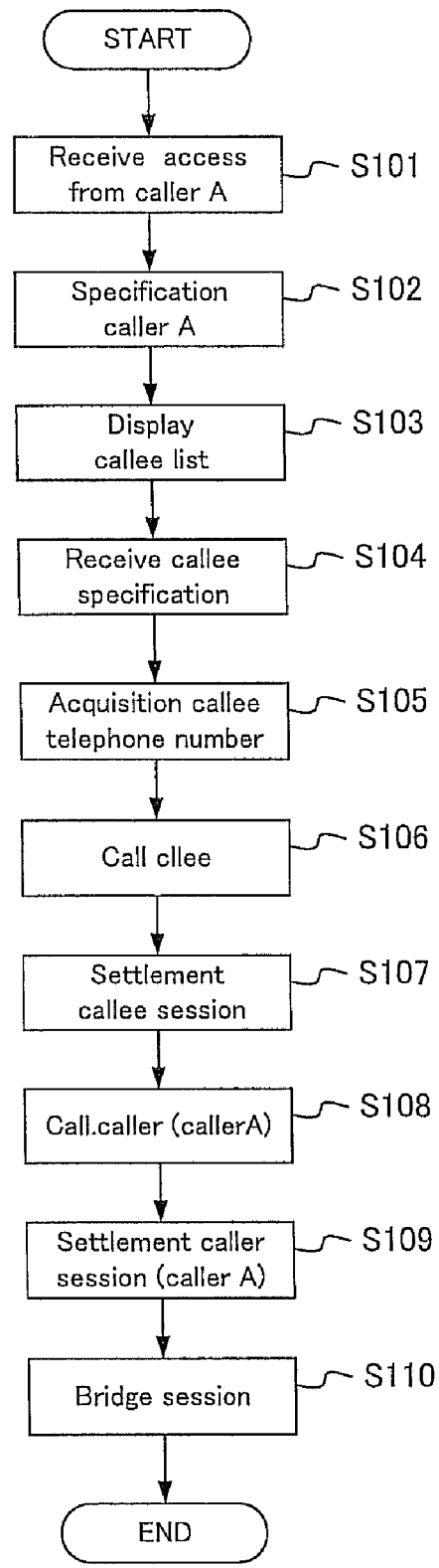
[FIG. 3] A flow chart explaining the call control of the call service system in a 1st embodiment.
Figure 4:
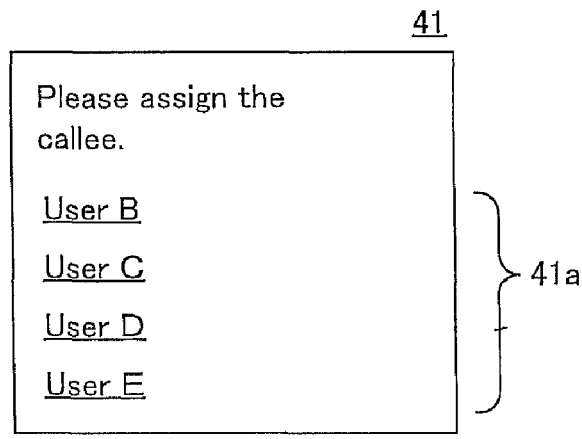
[FIG. 4] A figure showing an example of the callee list display screen in a 1st embodiment.

FIG. 2 is a block diagram showing a functional constitution of the application server 100 and the call service server 200 constitute the call service system 10. As shown in the figure, the application server 100 is provided with the Web function section 110 connected to IP network 70, the application section 120 which functions as a back end of the Web function section 110, and the user information storage section 130.

The Web function section 110 is a function section which performs Web front processing, for example, a Web server can constitute it. As this Web server, in document systems, such as WWW (World Wide Web), a server computer or a software has the function for sending information, including a HTML (HyperText Markup Language) file, a graphics file, a musical file, etc., can be used, and by this server, information, including an HTML document, a picture, etc., is accumulated and these pieces of information is sent through IP network 70 according to a demand of client software, such as a web browser.

Moreover, in particular at the embodiment, this Web function section 110 is provided also with a function as a connection request receive section which receives a connection request required of callee B from caller A via IP network 70 from the terminal unit 20b of caller A, the connection request including an information for specifying a telephone number of the cellular phone 20 of caller A, and an information for specifying a telephone number of the telephone 30 of callee B.

The Web function section 110 can execute the connection request on a Web page displayed on the cellular phone 20, for example. In the case of the present embodiment, a telephone number of the users A cellular phone 20 and a telephone number of the telephone 30 of callee B are memorized in the user information storage section 130, caller A only selects callee B on a Web page, and it can perform a connection request to callee B, without inputting a telephone number of the telephone 30 of callee B. And information on phone call reservation time or a priority can be included in a connection request if necessary.

The application section 120 asks a phone call connection processing between caller A and callee B to the call service server 200, according to a connection request from caller A which the Web function section 110 received. In detail, Based on an information included in a connection request from caller A, telephone number of the cellular phone 20 of caller A and telephone number of the telephone 30 of callee B are specified, and those information is notified to the call service server 200.

In addition, the application section 120 is provided with the reservation call processing section 121 and the priority processing section 122. The reservation call processing section 121 is explained in the 2nd embodiment, and the priority processing section 122 is explained in the 3rd embodiment.

The user information storage section 130 is a database built on a nonvolatile storage apparatus, and memorizes an information about a user who can receive service provided the call service system 10. In the case of the present embodiment, for example, an identification information of caller A, a telephone number of the telephone 20a of caller A, an identification information of the cellular phone 20 of caller A, and a list of users that caller A can specify as a communication destination are memorized. Callee B is contained in a list of users who can specify as a communication destination, and a telephone number of the telephone 30 of callee B is matched with them.

The call service server 200 is provided with the interface section 210, the call control section 220, and a plurality of communication terminals 230. The interface section 210 performs interface processing with the application server 100, receives a telephone number of a telephone of a caller, and a telephone number of a telephone of a callee, and notifies them to the call control section 220.

The call control section 220 is provided with the call caller section 221, the call callee section 222, and the bridge processing section 223, realizes a voice call between a telephone of a caller, and a telephone of a callee according to a telephone number of a telephone of a caller and a telephone number of a telephone of a callee which were announced from the interface section 210. The call control section 220 can perform call control by processing of software, for example.

Call caller section 221 calls from one of communication terminals 230 to the telephone of the user of a caller, it settles a callee voice call session between communication terminal 230 and the telephone of the caller.

The Call callee section 222 calls from one of communication terminals 230 to the telephone of the caller, a callee voice call session is settled between communication terminal 230 and the telephone of the user of a caller. In addition, as for this 1st embodiment, the call to the telephone of a caller is performed after establishment of a callee voice call session.

Bridge processing section 223 realizes the voice call between the telephone of a caller, and the telephone of a callee by bridge of the callee voice call session settled separately and the caller voice call session.

Communication terminal 230 comprises a plurality of terminals of UA1, UA2, UA3, and UAn, and the telephone number is assigned to each terminal. In the case of the present embodiment, telephone number 1, telephone number 2, telephone number 3, and telephone number n are each assigned to UA1, UA2, UA3, and UAn. In this embodiment, as for cellular phone 20 of caller A, and telephone 30 of callee B, a call session is each settled to one of communication terminals 230.

As a result, the telephone number of the call partner of caller A turns into a telephone number assigned to communication terminal 230 by which the caller call session was settled, the telephone number of the call partner of callee B turns into a telephone number assigned to communication terminal 230 by which the callee call session was settled. That is, caller A and callee B can talk over the telephone, without each recognizing a partner's telephone number. In other words, caller A and callee B can talk over the telephone, without an own telephone number being known by the partner.

[1st embodiment] In the following, the call control of call service system 10 in 1st embodiment is explained. First, this 1st embodiment is described. Drawing 3 is a flow chart explaining the call control of call service system 10 in the 1st embodiment. With following embodiments, the call control of the call service system 10 is explained for example the case where caller A uses cellular phone 20 having the function of terminal unit 20b, and the function of telephone 20a, and the call with callee B is required from call service system 10.

Processing is started when Web function section 110 of call service system 10 accepts access from cellular phone 20 of caller A (S101). Here, caller A is premised on knowing previously the address of the Web page provided by Web function section 110.

When the access from cellular phone 20 of caller A is accepted, application section 120 specifies caller A (S102). Specification of caller A can be carried out by referring to user's information storage section 130, for example using the identification information of cellular phone 20 received at the time of access. Or caller A can be specified also by carrying authenticating processing on a Web page and accepting the input of identification information from caller A. By specifying caller A, the telephone number of cellular phone 20 of caller A can also be specified.

When caller A is specified, application section 120 will create the list of callees who caller A can talk over the telephone with reference to user's information storage section 130, and display it on cellular phone 20 of caller A via Web function section 110 (S103).

Drawing 4 shows an example of callee list display screen 41 which indicates the callee list. On callee list display screen 41, User B, user C, user D, and user E who are the available callees obtained with reference to user's information storage section 130 are displayed on callee list display column 41a in the selectable state. Moreover, it is not necessary to display each telephone number of user B, user C, user D, and user E in callee list display column 41a.

When the specification to the user B is accepted as a callee (S104), the application section 120 will acquire the telephone number of the telephone 30 of callee B from caller A with reference to the user's information storage section 130 (S105). And the telephone number of the cellular phone 20 of caller A is notified as caller information to the call service server 200, the telephone number of the telephone 30 of callee B is notified as callee information, the call control request is carried.

In the call service server 200 which received the call control request, first, call callee section 222 dials the telephone number of the telephone 30 of callee B notified as callee information from one of the communication terminals 230 (the selected terminal is hereafter called "callee terminal") (S106).

In cases where the telephone 30 of callee B answers to this dial, the callee voice call session is settled between the callee terminal and the telephone 30 of callee B (S107).

And after the call caller section 221 verifies that the callee voice call session has been settled, the telephone number of the cellular phone 20 of caller A notified as caller information is dialed from one of the communication terminals 230 (the selected terminal is hereafter called "caller terminal") (S108).

When the cellular phone 20 of caller A answers to this dial, the caller voice call session will be settled between the caller terminal and the cellular phone 20 of caller A (S109).

When the caller voice call session is settled, the bridge processing section 223 will carry out the bridge of the callee voice call session and the caller voice call session (S110). Thereby, the voice call can be carried out between the cellular phone 20 of caller A, and the telephone 30 of callee B.

Thus, in the case of the 1st embodiment, when caller A carries the call request, after the callee voice call session with callee B is settled, the caller voice call session with caller A will be settled, Both voice call sessions are bridged. Therefore, while the situation where the session was settled is held up, caller A answered the receipt from the call service server 200 does not need to wait for the response of callee B. By this cause, the convenience of the call service system 10 will advance for caller A.

Figure 5:
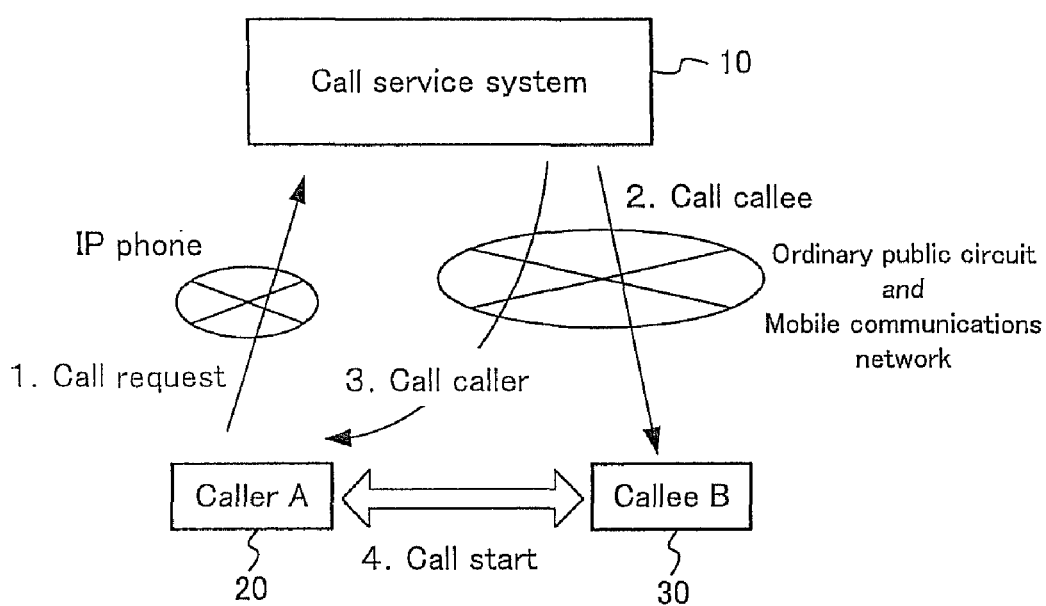
[FIG. 5] A figure showing the flow of processing of a 1st embodiment typically.

FIG. 5 is the figure showing the flow of processing of a 1st embodiment typically. As shown in this figure, the call request to callee B is sent to the call service system 10 via EP network 70 from the cellular phone 20 of caller A. Depending on this call request, the call service system 10 calls via the ordinary public circuit and the mobile communications network 80 to the telephone 30 of callee B first. And when the callee voice call session is settled between the call service system 10 and the telephone 30 of callee B, the system will call via the ordinary public circuit and the mobile communications network 80 to the cellular phone 20 of caller A. And when the caller voice call session is settled between the call service system 10 and the cellular phone 20 of caller A, the call service system 10 bridges the callee voice call session and the caller voice call session. Thereby, the voice call gets available between the cellular phone 20 of caller A, and the telephone 30 of callee B, without being kept waiting while caller A has been in the settlement situation of the caller voice call session.

In addition, the result called from one of the communication terminals 230 to the telephone number of the telephone 30 of callee B in processing (S106), callee B is unresponsive. In cases where the callee voice session is not able to be settled by unresponsive of callee B, it is advisable to notify that to the cellular phone 20 of caller A. Thereby, caller A does not need to continue waiting for receipt.

Some or all of the function of the application server 100 may be installed in the cellular phone 20 as application software. In this case, some or all of processing that is executed by the application server 100 is executed on the cellular phone 20, and that processing result can realize the above-mentioned call control processing similarly by receiving the call service server 200 from the cellular phone 20.

Figure 6:
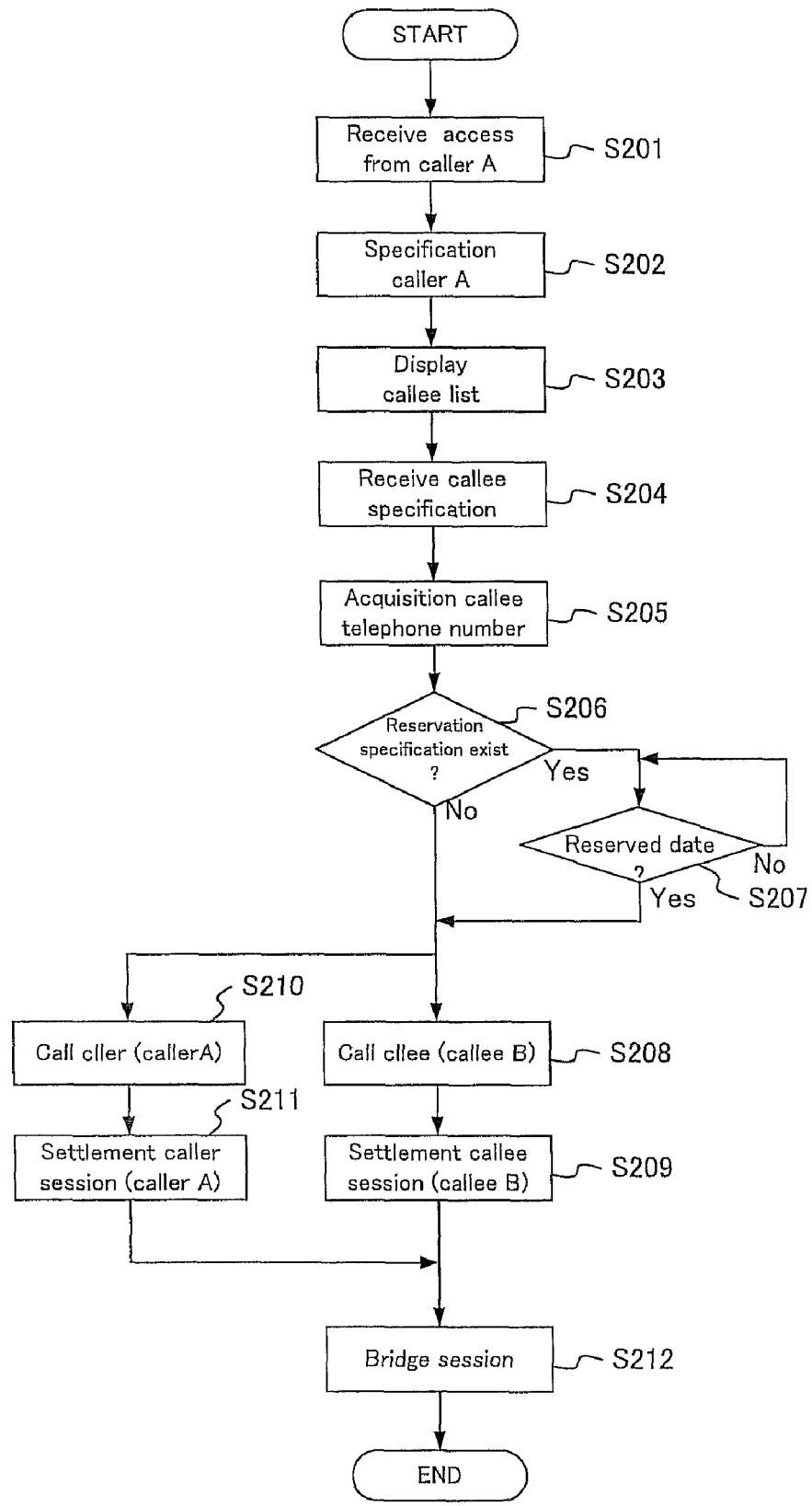
[FIG. 6] A flow chart explaining the call control of the call service system in a 2nd embodiment.

[2nd embodiment] Next, 2nd embodiment of the call control of the call service system 10 is described. FIG. 6 is the flow chart explaining the call control of the call service system 10 in the 2nd embodiment. According to a 2nd embodiment, caller A can reserve the time for the telephone call.

Even the 2nd embodiment, about the call control of the call service system 10, the case where the telephone call with callee B is required from the call service system 10 using the cellular phone 20 caller A has the cellular phone and the function of the terminal unit 20b and the function of the telephone 20a is explained as an example. Where, explanation is simplified about the processing common in the 1st embodiment.

This processing is started because the Web function section 110 of the call service system 10 accepts access from the cellular phone 20 of caller A (S201). When access from the cellular phone 20 of caller A is accepted, the application section 120 will specify caller A (S202). When caller A is specified, the application section 120 will create the list of available callees for caller A with reference to the user's information storage section 130, and will display it on the cellular phone 20 of caller A via the Web function section 110 (S203).

Figure 7:
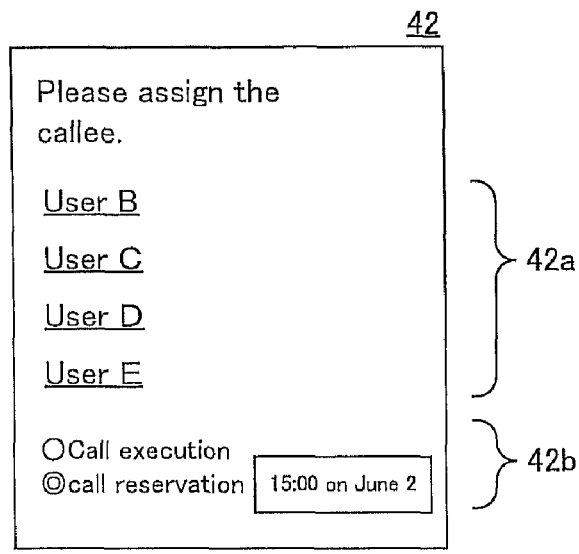
[FIG. 7] A figure showing an example of the callee list display screen in a 2nd embodiment.

FIG. 7 shows an example of the callee list display screen 42 which displayed the callee list. On the callee list display screen 42, the user B, the user C, the user D, and the user E are displayed on the callee list display column 42a in the selectable state as an available callee obtained with reference to the user's information storage section 130.

The telephone call reservation appointed field 42b is further provided in the callee list display screen 42, in the field, either "telephone call execution" which executes the telephone call immediately, or "telephone call reservation" which executes the telephone call at the reserved time is selectable. In cases where caller A wants to carry telephone call reservation, caller A selects "telephone call reservation" and inputs the time for the telephone call into the time input column of the telephone call reservation appointed field 42b.

When the application section 120 accepts the user B specification as a callee from caller A (S204), and acquires the telephone number of the telephone 30 of callee B with reference to the user's information storage section 130 (S205).

And specification of telephone call reservation is decided whether it exists or not (S206). In cases where there is no specification of telephone call reservation (S206: No), that is to say, in cases where "telephone call execution" is selected, immediately, the telephone number of the cellular phone 20 of caller A is notified as caller information, the telephone number of the telephone 30 of callee B is notified as callee information to the call service server 200, and the call control request is executed.

On the other hand, in cases where there is specification of telephone call reservation (S206: Yes), that is to say, in cases where "telephone call reservation" is selected and time is inputted, the reservation call processing section 121 memorizes the appointed reserved date, and stands by till the reserved date (S207:No). Accordingly the reservation call processing section 121 builds in the clock, the timer, etc., and has the function to manage time. And when the reserved date comes (S207: Yes), the telephone number of the cellular phone 20 of caller A is notified as caller information to the call service server 200, the telephone number of the telephone 30 of callee B is notified as callee information, the call control request is executed.

In cases where there is no specification of telephone call reservation (S206: No), or in cases where there is specification of telephone call reservation (S206: : Yes) and the appointed reserved date comes (S207: : Yes), the settlement (S210-S211) of the caller voice session with the cellular phone 20 of caller A and the settlement (S208-S209) of the callee voice session with the telephone 30 of callee B are carried.

Settlement processing of these voice sessions may be made parallel, unlike a 1st embodiment, or by carrying whichever first. That is, the call to the cellular phone 20 of caller A can be executed, without confirming the settlement of the callee voice session on the telephone 30 of callee B.

When the caller voice call session and the callee voice session are settled, the bridge processing section 223 bridges the callee voice call session and the caller voice call session (S212). Thereby, the voice call can be settled between the cellular phone 20 of caller A, and the telephone 30 of callee B.

Thus, according to the 2nd embodiment, when caller A carries the call request by the telephone call reservation appointed time, the call will be separately carried to the cellular phone 20 of caller A, and the telephone 30 of callee B at the reserved date. And after each voice call session is settled, both the voice call session are bridged. Therefore, when caller A needs to telephone the callee in the future, the telephone call is executed, without being forgotten. By this cause, the convenience of the call service system 10 will advance for caller A.

Figure 8:
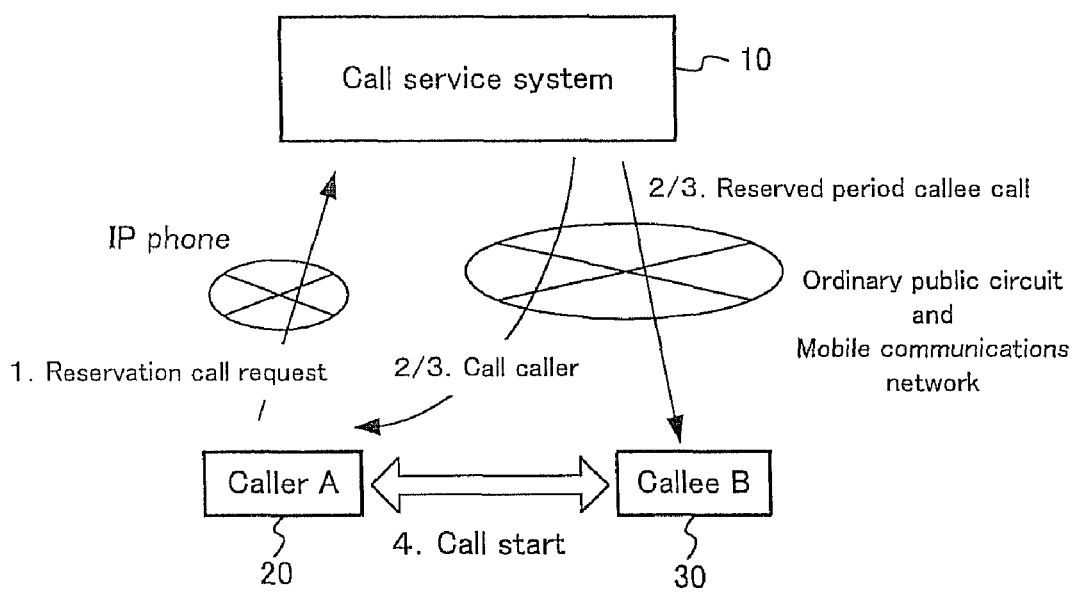
[FIG. 8] A figure showing the flow of processing of a 2nd embodiment typically.

FIG. 8 is the figure showing the flow of processing of a 2nd embodiment typically. As shown in this figure, the reservation call request appointed the date of the telephone call to callee B is sent to the call service system 10 via IP network 70 from the cellular phone 20 of caller A. When the reserved date comes depending on this reservation call request, the call is executed via the ordinary public circuit and the mobile communications network 80 from the call service system 10 on the cellular phone 20 of caller A, and the telephone 30 of callee B. And when the callee voice call session is settled between the call service system 10 and the telephone 30 of callee B and the caller voice call session is settled between the call service system 10 and the cellular phone 20 of caller A, the call service system 10 bridges the callee voice call session and the caller voice call session. Thereby, at the time caller A reserved, the voice call is available between the cellular phone 20 of caller A, and the telephone 30 of callee B.

In addition, some or all of the function of the application server 100 may be installed in the cellular phone 20 as application. In this case, some or all of the processing on the application server 100 is carried by the cellular phone 20 side, and the above call control processing is similarly realized because the call service server 200 receives that processing result from the cellular phone 20.

Figure 9:
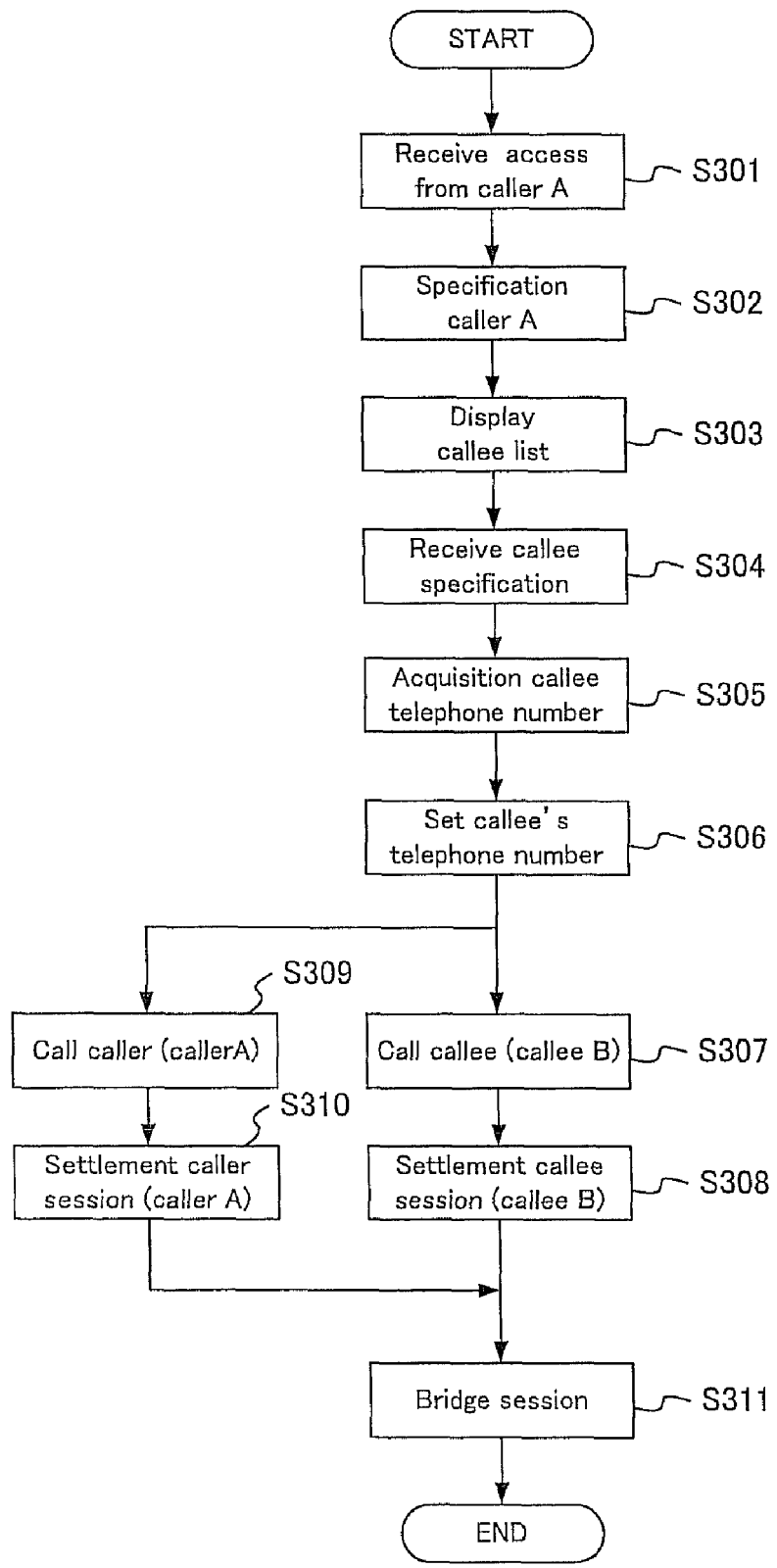
[FIG. 9] A flow chart explaining the call control of the call service system in a 3rd embodiment.

[3rd embodiment] Next, 3rd embodiment of the call control of the call service system 10 is described. FIG. 9 is the flow chart explaining the call control of the call service system 10 in a 3rd embodiment. With this 3rd embodiment, caller A can set up the priority of the telephone call and can notify it to callee B.

Here, the priority is selected and set up in "important", "normal", and the "no need reply." The telephone number is assigned to each terminal of the communication terminal 230 as shown in FIG. 2. According to this 3rd embodiment, the assigned telephone number and the priority are associated previously. For example, the priority "important" is associated with the telephone number 1 of communication terminal UA1, the priority "normal" is associated with the telephone number 2 of communication terminal UA2, and the "no need reply" is associated with the telephone number 3 of communication terminal UA3. This correspondency is memorized by the priority processing section 122, and callee B is also informed about it. In cases where the telephone 30 of callee B has the address book function to associate and register the telephone number and the name, the correspondency is preferably stored also in the address book of the telephone 30 of callee B.

Even the 3rd embodiment, about the call control of the call service system 10 The case where the telephone call with callee B is required from the call service system 10 using the cellular phone 20 caller A has the cellular phone and the function of the terminal unit 20b and the function of the telephone 20a is explained as an example. Where, explanation is simplified about the processing common in the 1st embodiment and the 2nd embodiment.

This processing is started because the Web function section 110 of the call service system 10 accepts access from the cellular phone 20 of caller A (S301). When access from the cellular phone 20 of caller A is accepted, the application section 120 will specify caller A (S302). When caller A is specified, the application section 120 will create the list of available callees for caller A with reference to the user's information storage section 130, and will display it on the cellular phone 20 of caller A via the Web function section 110 (S303).

Figure 10:
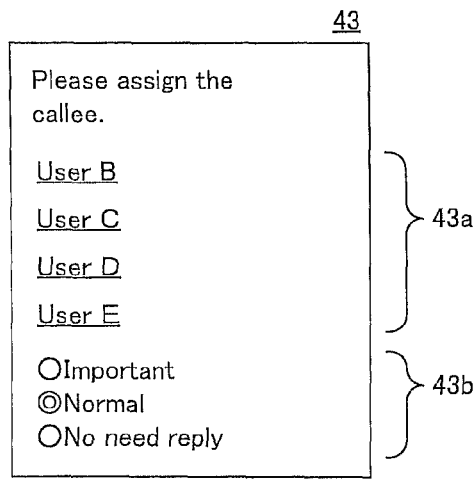
[FIG. 10] A figure showing an example of the callee list display screen in a 3rd embodiment.

FIG. 10 shows an example of the callee list display screen 43 which displayed the callee list. On the callee list display screen 43, the user B, the user C, the user D, and the user E are displayed on the callee list display column 43a in the selectable state as an available callee obtained with reference to the user's information storage section 130.

The priority appointed field 43b is further provided in the callee list display screen 43, in the field, the high priority "important", and "normal" and the low priority "no need reply" can be selected. The priority "normal" of the initial state is selected in this example. Caller A should select the priority "important", in order to inform callee B about the priority of the telephone call is high, a should select the priority the "no need reply", in order to inform callee B about the priority of the telephone call is low.

When the application section 120 accepts the user B specification as a callee from caller A (S304), with reference to the user's information storage section 130, the telephone number of the telephone 30 of callee B is acquired (S305).

And the priority processing section 122 sets up the telephone number according to the priority with selected caller A (S306). In this example, in cases where the priority "important" is selected, the telephone number 1 of terminal UA1 for the telephone call is set up, in cases where the priority "normal" is selected, the telephone number 2 of terminal UA2 for the telephone call is set up, in cases where the priority the "no need reply" is selected, the telephone number 3 of terminal UA3 for the telephone call is set up.

When the telephone number according to the priority is set up, the application section 120 informs the telephone number of the cellular phone 20 of caller A as caller information on the call service server 200, the telephone number of the telephone 30 of callee B is informed as callee information, the telephone number set up as call telephone number information is informed, the call control request is executed.

Depending on the call control request, the call service server 200 carries the caller voice session settlement (S309-S310) with the cellular phone 20 of caller A, and the callee voice session settlement (S307-S308) with the telephone 30 of callee B. It differs from the 1st embodiment, these voice sessions settlement processing may carry whichever first, and both may be executed in parallel. That is, the call to the cellular phone 20 of caller A can be executed, without confirming the callee voice session settlement with the telephone 30 of callee B.

Where, in the callee voice session settlement on the telephone 30 of callee B (S307-S308), the call (S307) to the telephone 30 of callee B is carried from the communication terminal 230 to which the telephone number set up by processing (S306) was assigned.

Thereby, callee B can know the degree of importance of the telephone call by confirming the call from which telephone number it is at the time of receipt. Therefore, the callee can decide whether it should answer immediately to the receipt, and its convenience of the callee will advance. In this case, if the correspondency of the priority and the telephone number is registered into the address book of the telephone 30 of callee B, in order that the priority will be displayed instead of the telephone number as a character of "important", "normal", and "no need reply", convenience advances more.

When the caller voice call session and the callee voice session are settled, the bridge processing section 223 bridges the callee voice call session and the caller voice call session (S311). Thereby, the voice call gets available between the cellular phone 20 of caller A, and the telephone 30 of callee B.

Figure 11:
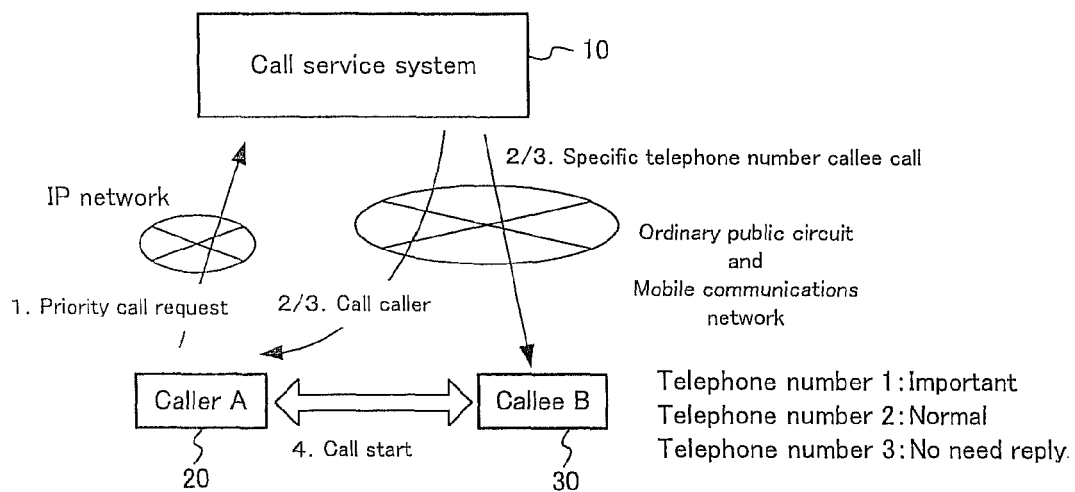
[FIG. 11] A figure showing the flow of processing of a 3rd embodiment typically.

FIG. 11 is the figure showing the flow of processing of a 3rd embodiment typically. As shown in this figure, the call request by which the priority over callee B was added to the call service system 10 is sent via IP network 70 from the cellular phone 20 of caller A. Depending on this call request to which the priority was added, the call service system 10 calls to the cellular phone 20 of caller A via the ordinary public circuit and the mobile communications network 80, from the communication terminal 230 to which the telephone number according to the priority was assigned, the call to the telephone 30 of callee B is executed. And when the callee voice call session is settled between the call service system 10 and the telephone 30 of callee B and the caller voice call session is settled between the call service system 10 and the cellular phone 20 of caller A, the call service system 10 bridges the callee voice call session and the caller voice call session. Thereby, the voice call gets available between the cellular phone 20 of caller A, and the telephone 30 of callee B at the time reserved by caller A.

In addition, some or all of the function of the application server 100 may be installed in the cellular phone 20 as application. In this case, some or all of the processing on the application server 100 is carried by the cellular phone 20 side, and the above call control processing is similarly realized because the call service server 200 receives that processing result from the cellular phone 20.

Figure 12:
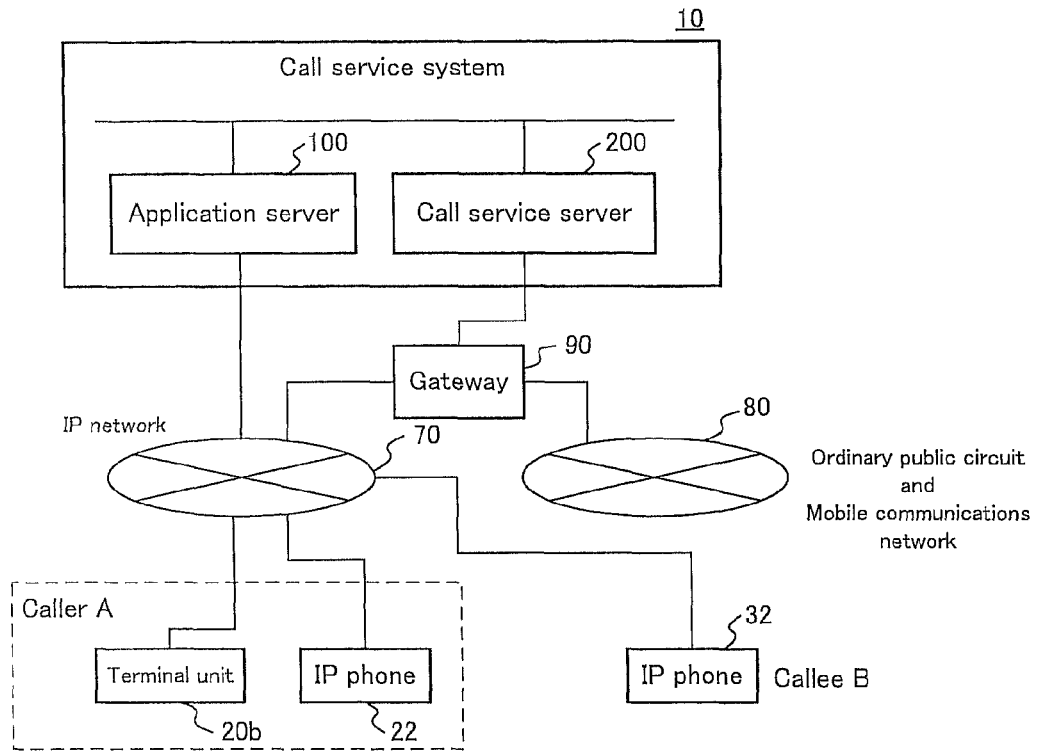
[FIG. 12] A block diagram showing the modification of the network containing the call service system.

(Modification) In the case of the above 1st-3rd Embodiments, even though caller A and callee B executed the telephone call using the telephone connected to the ordinary public circuit and the mobile communications network 80, those one side or both sides may be made the call over the telephone using the IP phone which carries the voice call by the Internet protocol. FIG. 12 is the block diagram showing the network when caller A and callee B use the IP phone.

In the example of this figure, IP phone 22 which caller A uses is connected to IP network 70, and IP phone 32 which callee B uses is connected to IP network 70. In this case, the call from the call service server 200 is sent to IP phone 32 which IP phone 22 and callee B which caller A uses use via IP network 70, Basic control management is executed like the above example.

Figure 13:
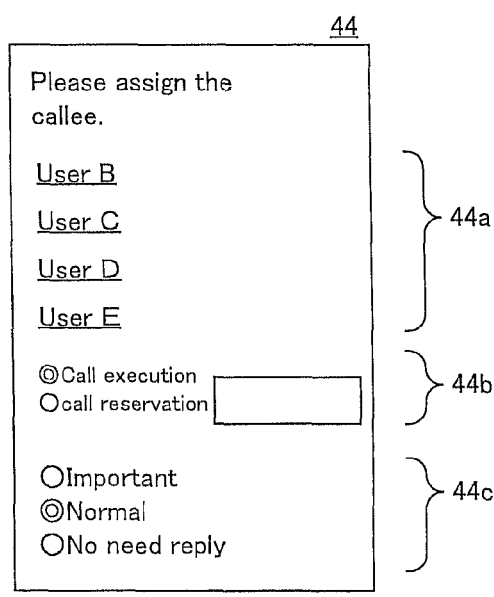
[FIG. 13] A figure showing the modification of the callee list display screen.

Both the telephone call reservation explained by a 2nd embodiment and the priority explained by a 3rd embodiment may be appointed. FIG. 13 shows an example of the callee list display screen 44 which both telephone call reservation and the priority can appoint. On the callee list display screen 44, the user B, the user C, the user D, and the user E who are the available callees obtained with reference to the user's information storage section 130 are displayed on the callee list display column 44a in the selectable state, in the telephone call reservation appointed field 44b, the priority "telephone call execution" which executes the telephone call immediately, and "telephone call reservation" which executes the telephone call at the reserved time can be selected, In the priority appointed field 44c, the high priority "important", and "normal" and the low priority "no need reply" can be selected.

The control in this case is realizable by combining the flow chart shown in FIG. 6, and the flow chart shown in FIG. 9. Accordingly depending on the existence of telephone call reservation, the execution date of the call to the telephone 30 of the cellular phone 20 of caller A and the callee B is controlled, the call to the telephone 30 of callee B is executed using the telephone number according to the selected priority. The 1st embodiment is combined to the 2nd embodiment, the 3rd embodiment, or this modification, after the callee voice call session with callee B is settled, the caller voice call session with caller A is settled, Both voice call sessions may be bridged.

Figure 14:
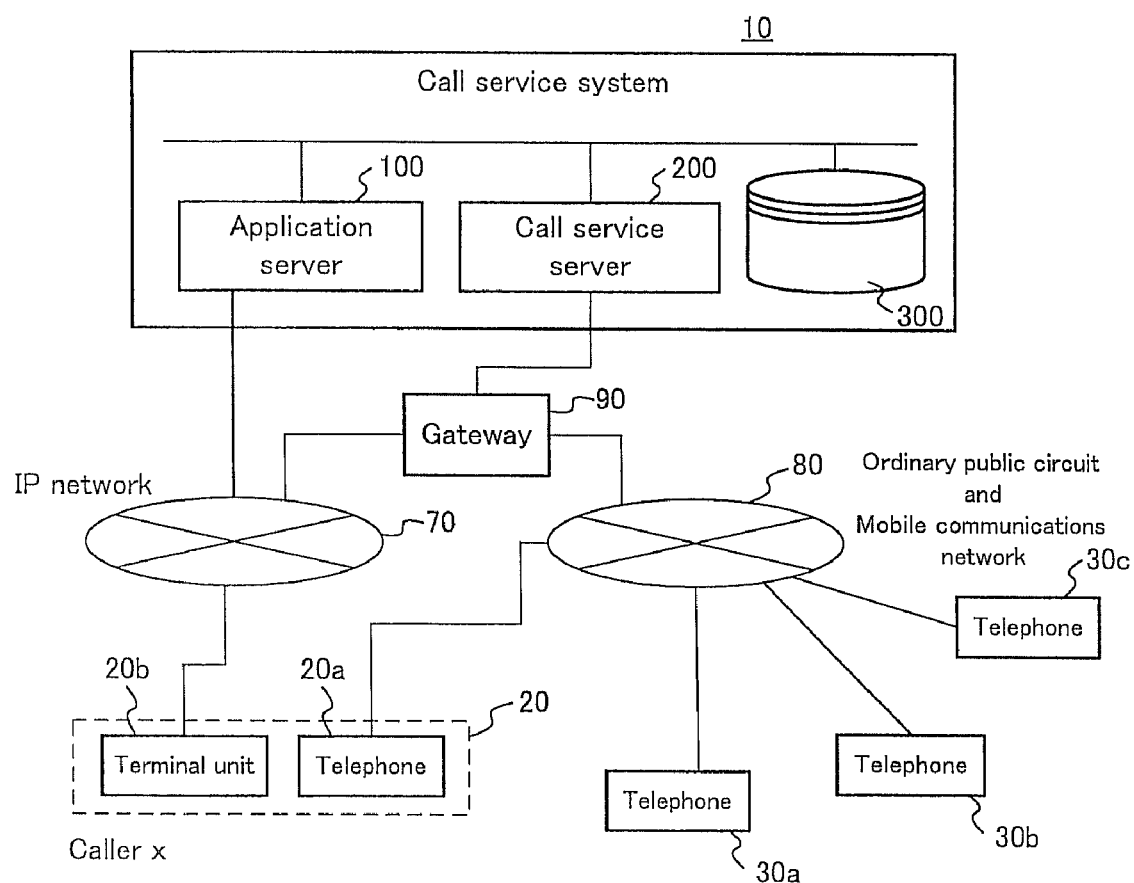
[FIG. 14] A block diagram showing the network containing the call service system in a 4th embodiment.

[4th embodiment] Next, a 4th embodiment of the call control of the call service system 10 is described. FIG. 14 is the block diagram showing the composition of the network system containing the call service system 10 to which the present invention is applied.

As shown in FIG. 14, the call service system 10 is the call control system for connecting with the group constituted by a plurality of user a-c depending on operation of caller x, in the case of the present embodiment, the group consists of the entry member of the conference call. In detail, the call service system 10 is provided with the application server 100, the call service server 200, and the user database 300, is connected with IP network 70 and connected to the ordinary public circuit and the mobile communications network 80 via the gateway 90.

At this point, IP network 70 is a network which performs information transmission by the Internet protocol, and is the Internet typically. An ordinary public circuit and the mobile communications network 80 are general terms for a telephone line which performs voice calls, such as a landline and mobile communications. The gateway 90 performs processing which does an interconversion of data format, the protocol, etc., in order to enable interactive communication with IP network 70, and an ordinary public circuit and a mobile communications network 80.

In the example of this figure, the case where caller x convenes callees a-c which is the participant at the conference call to the conference call using the service provided by the call service system 10 is shown. Caller x can use the terminal unit 20b which has an IP network connection function and a web browser function, and the telephone 20a which has an ordinary public circuit and a mobile communications network connection function, in this example, the user A uses the cellular phone 20 which has the terminal unit 20b and a function of a both of the telephone 20a. Accordingly, the cellular phone 20 has a telephone function of mobile communications, and a function which accesses a Web page by IP network 70 is added. Callees a-c uses the telephones 30a-30c have the ordinary public circuit and the mobile communications network connection function. A landline and a mobile radiotelephone can be used as the telephone 30a-30c.

Figure 15:
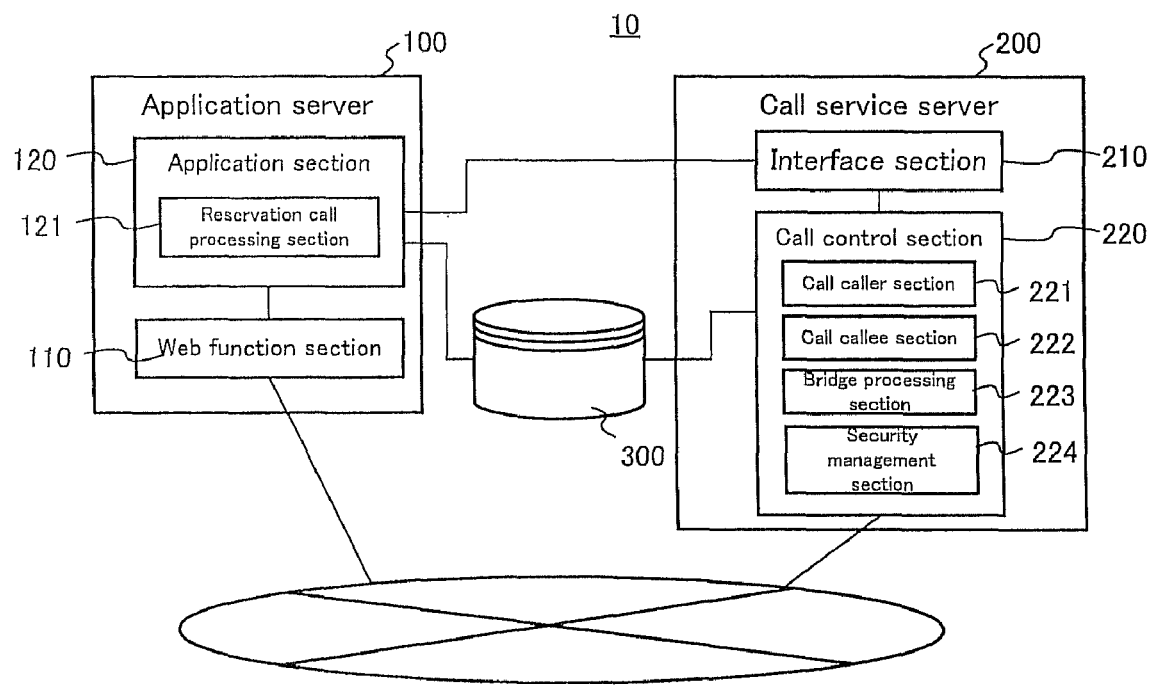
[FIG. 15] (a) is the block diagram showing the functional constitution of the call service system in a 4th embodiment, and (b) is the explanatory view showing the data structure of the user database.
Figure 15:
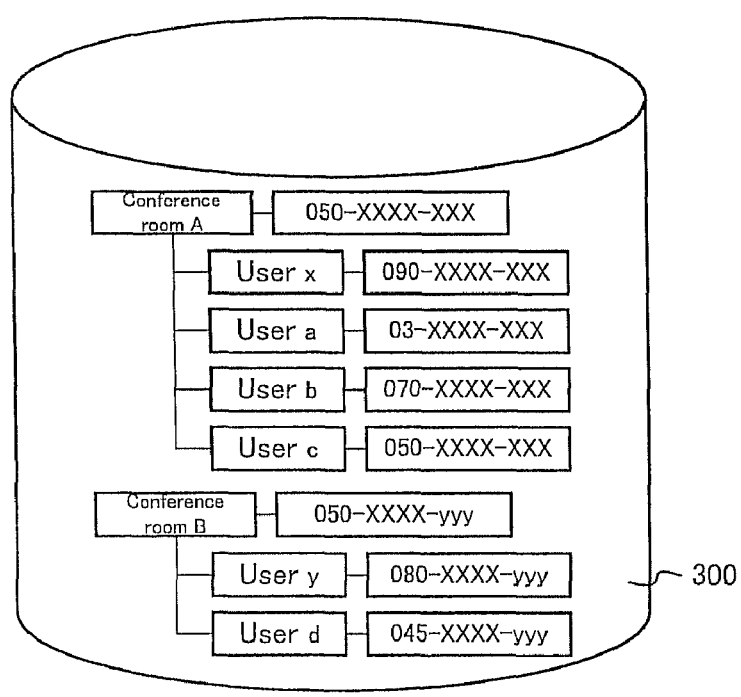

FIG. 15 (a) is the block diagram showing the functional constitution of the application server 100 and the call service server 200 which constitute the call service system 10, FIG. 15 (b) is the explanatory view showing the data structure of the user database 300 typically.

As shown in FIG. 15 (a), the application server 100 is provided with the Web function section 110 connected to IP network 70, and the application section 120 which works as a back end of the Web function section 110. The user database 300 is connected to these application servers 100 and the call service server 200, the data of the user database 300 can be shared.

The user database 300 is a database device which relates and memorizes calling telephone number (050-xxxx-xxxx) indigenous in the group, and the telephone number of caller x which is the user belonging to the group, and the telephone terminal of the callees a-c. In detail, the user database 300 is a database built on a nonvolatile storage apparatus, and memorizes an information about a user who can receive service provided the call service system 10. In the case of the present embodiment, for example, be shown in FIG. 15 (b), the name for every conference room which is the group, and calling telephone number indigenous to each conference room are stored, it is related with each conference room, the identification information of caller x who is the member of the conference room concerned, the telephone number of the telephone 20a of caller x, the identification information of the cellular phone 20 of caller x, and the list of users who can appoint as a participant (callee) convened for caller x are memorized. Callees a-c is contained in the list of users who can appoint as a callee, the telephone number of telephones 30 a-c of callees a-c is related with them.

The Web function section 110 is a function section which performs Web front processing, for example, a Web server can constitute it. As this Web server, in document systems, such as WWW (World Wide Web), a server computer or a software has the function for sending information, including a HTML (HyperText Markup Language) file, a graphics file, a musical file, etc., can be used, and by this server, information, including an HTML document, a picture, etc., is accumulated and these pieces of information is sent through IP network 70 according to a demand of client software, such as a web browser.

Moreover, in the case of the present embodiment, particularly, this Web function section 110 is provided also with the function as a connection request receive section which receives the connection request via IP network 70 from the terminal unit 20b of caller x, the connection request which is required of callees a-c from caller x, and includes the information for specifying the telephone number of the cellular phone 20 of caller x, and the information for specifying the telephone number of the conference room or callees a-c, via IP network 70 from the terminal unit 20b of caller x.

The Web function section 110 can execute the connection request on a Web page displayed on the cellular phone 20, for example. In the case of the present embodiment, the telephone number of the cellular phone 20 of caller x and the telephone number of telephones 30 a-c of callees a-c are memorized by user DB300, caller x only selects arbitrary callees a-c on the Web page, and it can carry the connection request to callees a-c, without inputting the telephone number of telephones 30 a-c of the callees a-c. And information on phone call reservation time or a priority can be included in a connection request if necessary.

Moreover, in the case of the present embodiment, the call control section 220 is also provided with the function as a connection request receive section, the connection request to callees a-c can be sent also by the call to the call service server 200 from caller x. In detail, by calling in the call control section 220 from caller x, the call of the conference room is started, the telephone number indigenous to this conference room is dialed, and the call is executed. The call control section 220 received this call attests by the user's x telephone number contained in the calling signal, it sends out to the application section 120 of the application server 100 as a connection request, this user's x telephone number, and the telephone number by the side of the called call service, namely, calling telephone number. The voice guidance function by the talkie is provided in this call control section 220, the additional information, including the setup of the above reservation time, etc., can be inputted by voice input or the dial push operation.

The application section 120 convenes callees a-c which is the group's member to the call service server 200 depending on the connection request by caller x accepted from the Web function section 110 or the call control section 220. In detail, the application section 120 requests the telephone call connection processing between caller x and a plurality of callees a-c, from the information included in the connection request from caller x, a specifies the telephone number of the cellular phone 20 of caller x, and the telephone number of telephones 30 a-c of callees a-c with reference to user DB 300 depending on the connection request, and informs them to the call service server 200. The application section 120 is provided with the reservation call processing section 121.

The call service server 200 is provided with the interface section 210 and the call control section 220. The interface section 210 carries interface processing with the application server 100, a receives the telephone number of the telephone of the caller, and the telephone number of the telephone of the callee, and carries processing informed to the call control section 220.

The call control section 220 is provided with the call caller section 221, call callee section 222, the bridge processing section 223, and the security management section 224, settles the voice call between the telephone of the caller, and the telephone of the callee using the telephone number of the telephone of the caller and the telephone number of the telephone of the callee which were informed from the interface section 210. The call control section 220 can carry the call control by processing of software, for example.

The call caller section 221 is called from the communication terminal associated with one of calling telephone number to the telephone of the user of the caller, a carries processing which settles the callee voice call session between calling telephone number and the telephone of the user of the caller.

Call callee section 222 is called from the communication terminal associated with one of calling telephone number to the telephone of the user of the caller, and carries processing which settles the callee voice call session between calling telephone number and the telephone of the user of the caller. Moreover, in the case of the present embodiment, the call to the telephone of a caller is performed after establishment of a callee voice call session.

Bridge processing section 223 realizes the voice call between the telephone of a caller, and the telephone of a callee by bridge of the callee voice call session settled separately and the caller voice call session.

The security management section 224 is a module which mainly manages the security of the conference room under execution, a attests the user who was late for the meeting, and checks wrong intervention. The case of being late for the meeting is in the state out of which the callee does not come to the telephone, for example, when it assembles by calling telephone number, since it comes to be telephoned later, it can participate in the meeting by carrying the call from the callee. On this occasion, the security management section 224 compares the user database 300 based on the telephone number notice of the call origin (callee) included in the call concerned about the call from the callee, To the call from the number which has not been registered into the user database 300, a refuses connection, to the call from the number registered, settles connection and permits the intervention in the conference room.

Figure 16:
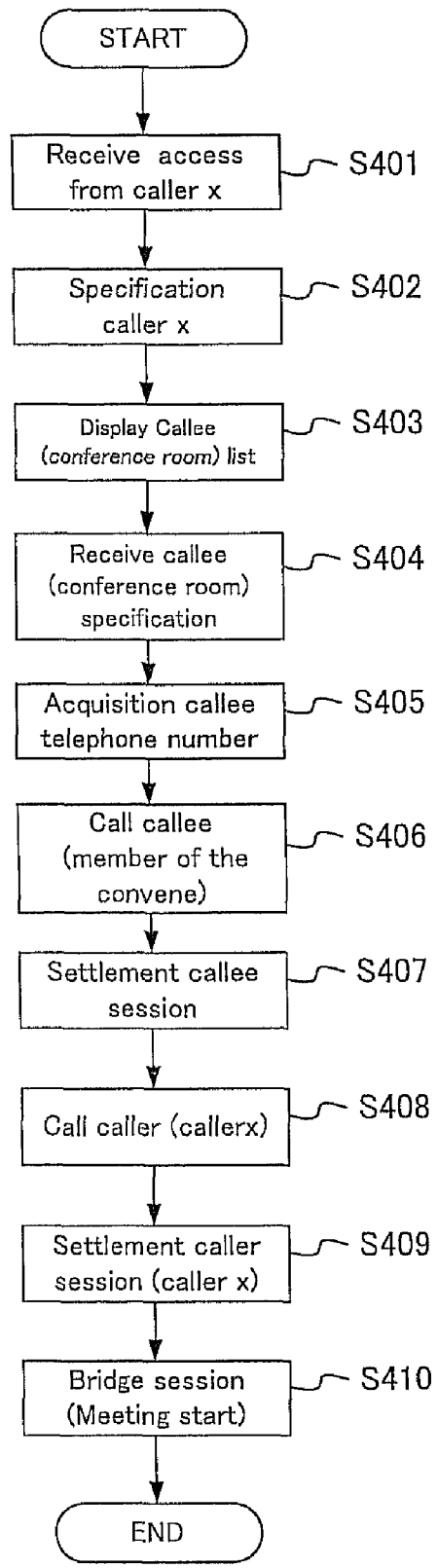
[FIG. 16] A flow chart explaining the call control of the call service system in a 4th embodiment.

(Call control method) The call control method of the present invention can be enforced by operating the call service system 10 which has the above composition. FIG. 16 is the flow chart explaining the call control of the call service system 10. The call control of the call service system 10 is explained to the example for the case where caller x convenes the conference call with callees a-c to the call service system 10 in the case of the present embodiment using the cellular phone 20 having the function of the terminal unit 20b, and the function of the telephone 20a.

This processing is started because the Web function section 110 of the call service system 10 accepts access from the cellular phone 20 of caller x (S401). Here, caller A is premised on knowing previously the address of the Web page provided by Web function section 110.

When access from the cellular phone 20 of caller x is accepted, the application section 120 will specify caller x (S402). Specification of caller x can be carried by referring to the user database 300, for example using the identification information of the cellular phone 20 received at the time of access. Or it may be made to specify caller x by carrying authenticating processing with the use ID or the password on the Web page, and accepting the input of identification information from caller x. By specifying caller x, the telephone number of the cellular phone 20 of caller x can also be specified.

When caller x is specified, application section 120 will create the list of callees who caller x can talk over the telephone with reference to user's information storage section 130, and display it on cellular phone 20 of caller x via Web function section 110 (S403).

Figure 17:
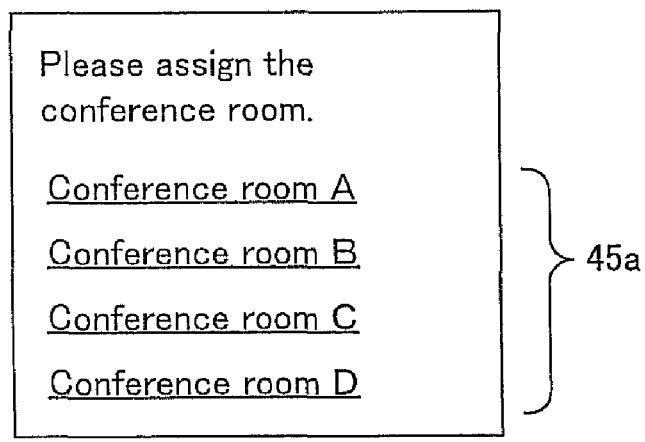
[FIG. 17] A figure showing an example of the callee list display screen in a 4th embodiment.

FIG. 17 shows an example of the callee list display screen 45 which displayed the callee list. On the callee list display screen 45, conference room A-D which is the available conference room obtained with reference to the user database 300 is displayed on the callee list display column 41a in the selectable state. The users a-c are contained in each conference room A-D as the member, for example, by selecting the conference room, the call for the call will be carried to the member of each conference room. Here, the conference room B shall be selected.

That is, when specification of the conference room B is accepted as a callee from caller x (S404), the application section 120 acquires the calling telephone number of the conference room B, and the telephone number of telephones 30 a-c of callees a-c with reference to the user database 300 (S405). And the telephone number of the cellular phone 20 of caller a-c is notified as caller information to the call service server 200, the telephone number of the telephones 30 a-c of callee B is notified as callee information, the call control request is carried.

In the call service server 200 which received the call control request, first, call callee section 222 dials to the telephone number of telephones 30 a-c of callees a-c informed as callee information (S406). In cases where telephones 30 a-c of callees a-c answers to this dial, the callee voice call session is settled between the callee terminal of calling telephone number, and telephones 30 a-c of callees a-c (S407).

And the call caller section 221 calls using calling telephone number to the telephone number of the cellular phone 20 of caller x informed as caller information, after verifying that one or more callee voice call sessions have been settled (S408). When the cellular phone 20 of caller x answers to this call, the caller voice call session will be settled between the caller terminal and the cellular phone 20 of caller x (S409). Subsequently, when the caller voice call session is settled, the bridge processing section 223 bridges the callee voice call session and the caller voice call session (S410). Thereby, the voice call can be carried now between the cellular phone 20 of caller x, and telephones 30 a-c of callees a-c.

Thus, in the case of the present embodiment, when caller x carries the call of the call request, namely, the meeting, after at least one callee voice call session with callees a-c is settled, the caller voice call session with caller x is settled, both the voice call session is bridged, and the meeting is made to be started. Therefore, while the situation where the session was settled is held up, caller x answered the receipt from the call service server 200 does not need to wait for the response of callees a-c.

Figure 18:
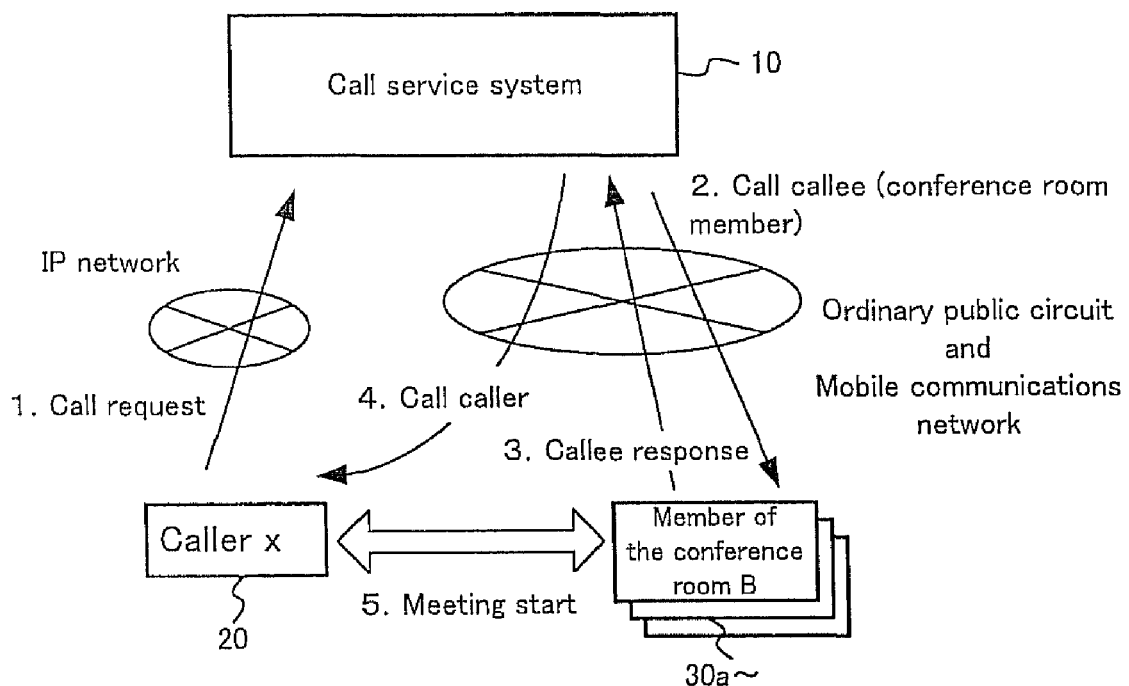
[FIG. 18] A figure showing the flow of the processing in a 4th embodiment typically.

FIG. 18 is the figure showing the flow of processing concerning this embodiment typically. As shown in this figure, the call request to callees a-c is sent to the call service system 10 via IP network 70 from the cellular phone 20 of caller x. Depending on this call request, the call service system 10 calls via the ordinary public circuit and the mobile communications network 80 to telephones 30 a-c of callees a-c first. And when the callee voice call session is settled between the call service system 10 and telephones 30 a-c of callees a-c, the system will call via the ordinary public circuit and the mobile communications network 80 to the cellular phone 20 of caller x. And when the caller voice call session is settled between the call service system 10 and the cellular phone 20 of caller x, the call service system 10 bridges the callee voice call session and the caller voice call session. Thereby, the conference call is started, the voice call gets available between the cellular phone 20 of caller x, and the telephones 30 a-c of callees a-c, without being kept waiting while caller x has been in the settlement situation of the caller voice call session.

Moreover, the result made to call from one of calling telephone number to the telephone number of telephones 30 a-c of callees a-c by processing (S406), In cases where the callee voice session is not able to be settled by unresponsive of callees a-c, it is advisable to notify that to the cellular phone 20 of caller x. Thereby, caller x does not need to continue waiting for receipt.

Some or all of the function of the application server 100 may be installed in the cellular phone 20 as application software. In this case, some or all of processing that is executed by the application server 100 is executed on the cellular phone 20, and that processing result can realize the above-mentioned call control processing similarly by receiving the call service server 200 from the cellular phone 20.

Figure 19:
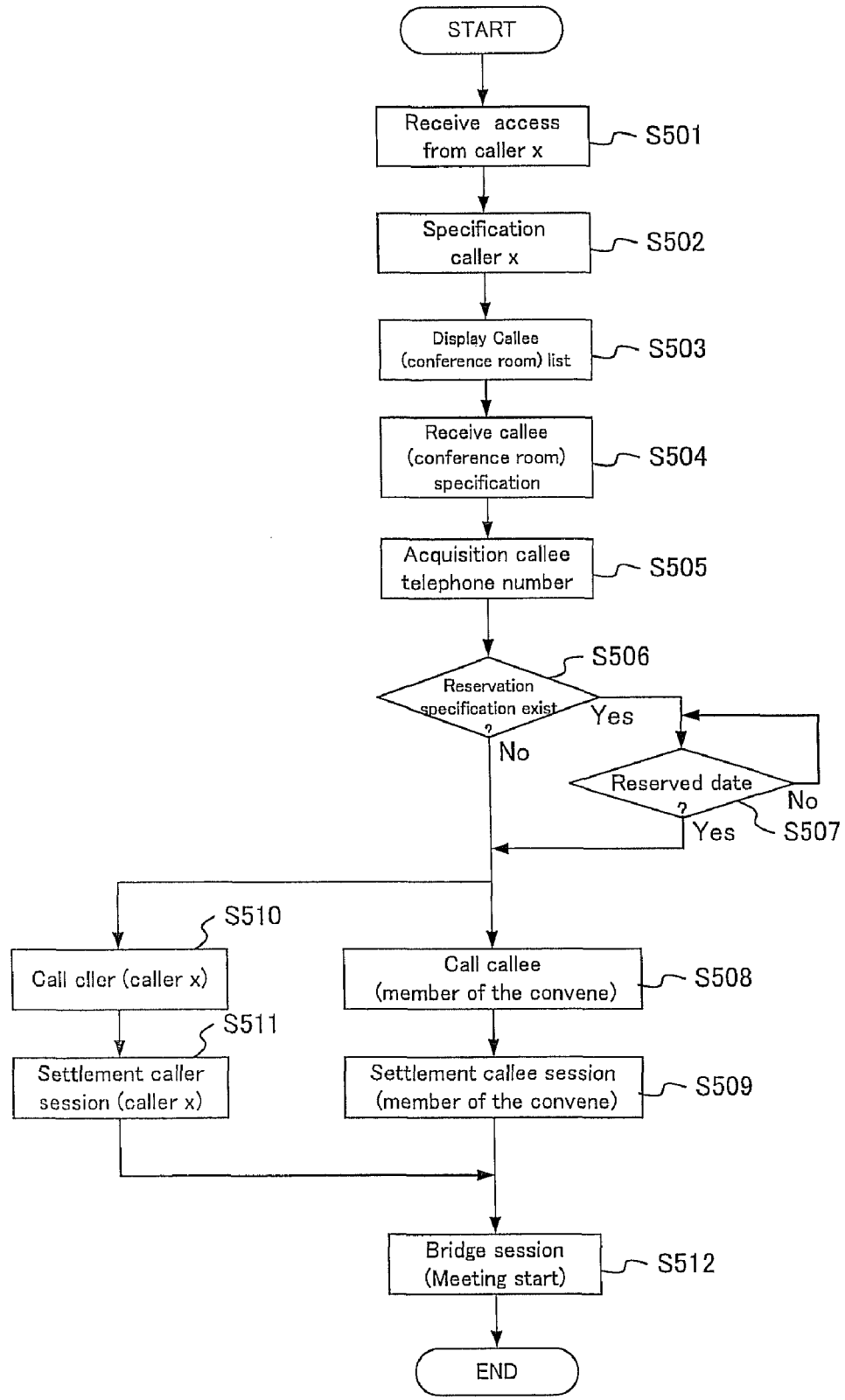
[FIG. 19] A flow chart explaining the reservation call control of the call service system in a 4th embodiment.

Next, in the call control of the call service system 10, the case where caller x reserves the time of the telephone call is explained. FIG. 19 is the flow chart explaining the call control of the call service system 10 using the reserving function.

As shown in FIG. 19, this processing is started because the Web function section 110 of the call service system 10 accepts access from the cellular phone 20 of caller x (S501). When access from the cellular phone 20 of caller x is accepted, the application section 120 will specify caller x (S502). When caller x is specified, refer to the user database 300 for the application section 120, creates the list of callees who caller A can talk over the telephone, and is made to display it on the cellular phone 20 of caller x via the Web function section 110 (S503).

Figure 20:
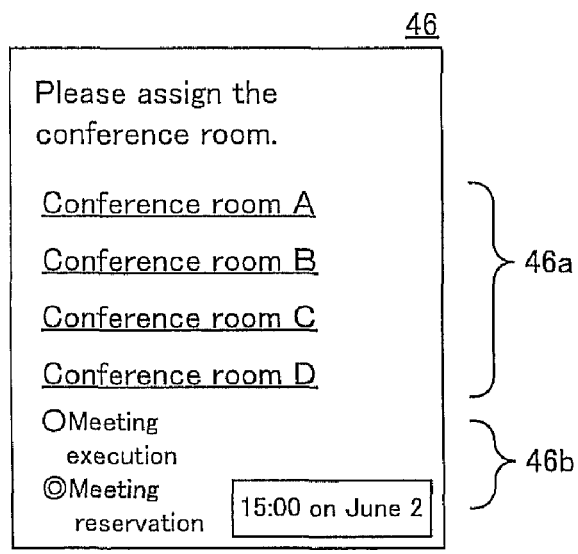
[FIG. 20] A figure showing an example of the callee list display screen of the reservation telephone call in a 4th embodiment.

FIG. 20 shows an example of the callee list display screen 46 which displayed the callee list. On callee list display screen 46, conference room A-D which is the available conference room obtained with reference to the user database 300 is displayed on the callee list display column 46*a* in the selectable state.

The telephone call reservation appointed field 46*b* is further provided in the callee list display screen 46, in the field, either "telephone call execution" which executes the telephone call immediately, or "telephone call reservation" which executes the telephone call at the reserved time is selectable. In cases where caller x wants to carry telephone call reservation, caller x selects "telephone call reservation" and inputs the time for the telephone call into the time input column of the telephone call reservation appointed field 46*b*.

When the application section 120 accepts the user B specification as a callee from caller x (S504), and acquires the telephone number of telephones 30 *a-c* of callees a-c with reference to the user database 300 (S505).

And specification of telephone call reservation is decided whether it exists or not (S506). In cases where there is no specification of telephone call reservation (S506: No), that is to say, in cases where "telephone call execution" is selected, immediately, the telephone number of the cellular phone 20 of caller x is notified as caller information, the telephone number of the telephones 30 *a-c* of callees a-c is notified as callee information to the call service server 200, and the call control request is executed.

On the other hand, in cases where there is specification of telephone call reservation (S506: Yes), that is to say, in cases where "telephone call reservation" is selected and time is inputted, the reservation call processing section 121 memorizes the appointed reserved date, and stands by till the reserved date (S507: No). Accordingly the reservation call processing section 121 builds in the clock, the timer, etc., and has the function to manage time. And when the reserved date comes (S507: Yes), the telephone number of the cellular phone 20 of caller x is notified as caller information to the call service server 200, the telephone number of the telephones 30 *a-c* of callees a-c is notified as callee information, the call control request is executed.

In cases where there is no specification of telephone call reservation (S506: No), or in cases where there is specification of telephone call reservation (S506: Yes) and the appointed reserved date comes (S507: Yes), the settlement (S510-S511) of the caller voice session with the cellular phone 20 of caller x and the settlement (S508-S509) of the callee voice session with the telephones 30 *a-c* of callees a-c are carried.

Settlement processing of these voice sessions may be made parallel, or by carrying whichever first. That is, the call to the cellular phone 20 of caller x can be executed, without confirming the settlement of the callee voice session on the telephones 30 *a-c* of callees a-c.

When the caller voice call session and the callee voice session are settled, the bridge processing section 223 bridges the callee voice call session and the caller voice call session (S512). Thereby, the voice call can be settled between the cellular phone 20 of caller x, and the telephones 30 *a-c* of callees a-c.

Thus, when caller x carries the call request as reservation of the conference room which appointed the date, the call will be separately carried to the reserved date at the cellular phone 20 of caller x, and telephones 30 *a-c* of callees a-c. And after each voice call session is settled, both the voice call session are bridged. Therefore, when caller x needs to telephone the callee in the future, the telephone call is executed, without being forgotten. By this cause, the convenience of the call service system 10 will advance for caller x.

Figure 21:
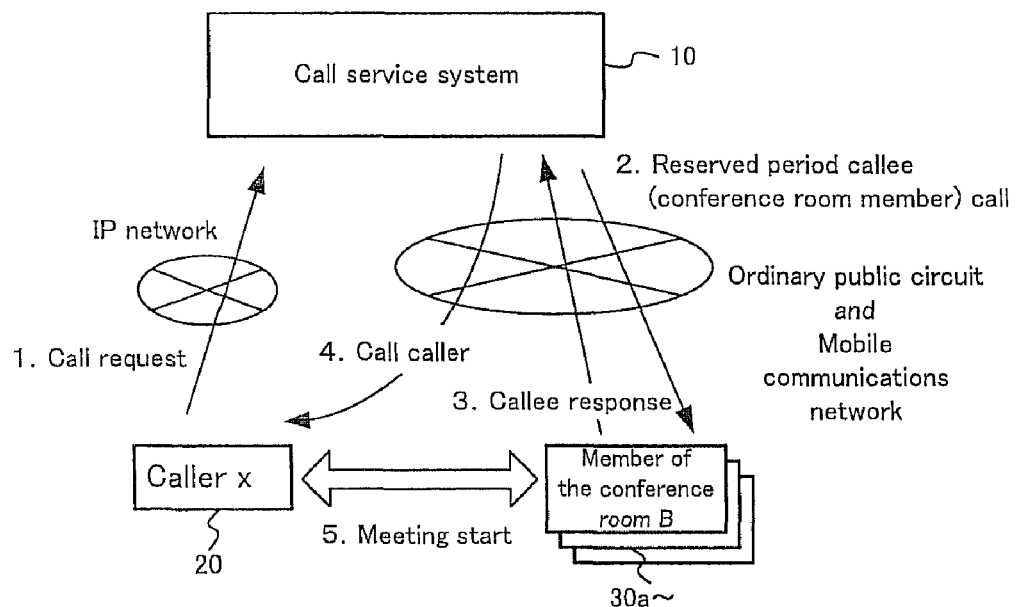
[FIG. 21] A figure showing typically the flow of processing of the reservation telephone call in a 4th embodiment.

FIG. 21 is the figure showing typically the flow of the processing which used the reserving function. As shown in this figure, the reservation call request appointed the date of the telephone call to callees a-c is sent to the call service system 10 via IP network 70 from the cellular phone 20 of caller A. When the reserved date comes depending on this reservation call request, the call is executed via the ordinary public circuit and the mobile communications network 80 from the call service system 10 on the cellular phone 20 of caller x, and the telephones 30 *a-c* of callees a-c. And when the callee voice call session is settled between the call service system 10 and the telephones 30 *a-c* of callees a-c and the caller voice call session is settled between the call service system 10 and the cellular phone 20 of caller x, the call service system 10 bridges the callee voice call session and the caller voice call session. Thereby, at the time caller x reserved, the voice call is available between the cellular phone 20 of caller x, and the telephones 30 *a-c* of callees a-c.

In addition, some or all of the function of the application server 100 may be installed in the cellular phone 20 as application. In this case, some or all of the processing on the application server 100 is carried by the cellular phone 20 side, and the above call control processing is similarly realized because the call service server 200 receives that processing result from the cellular phone 20.

Figure 25:
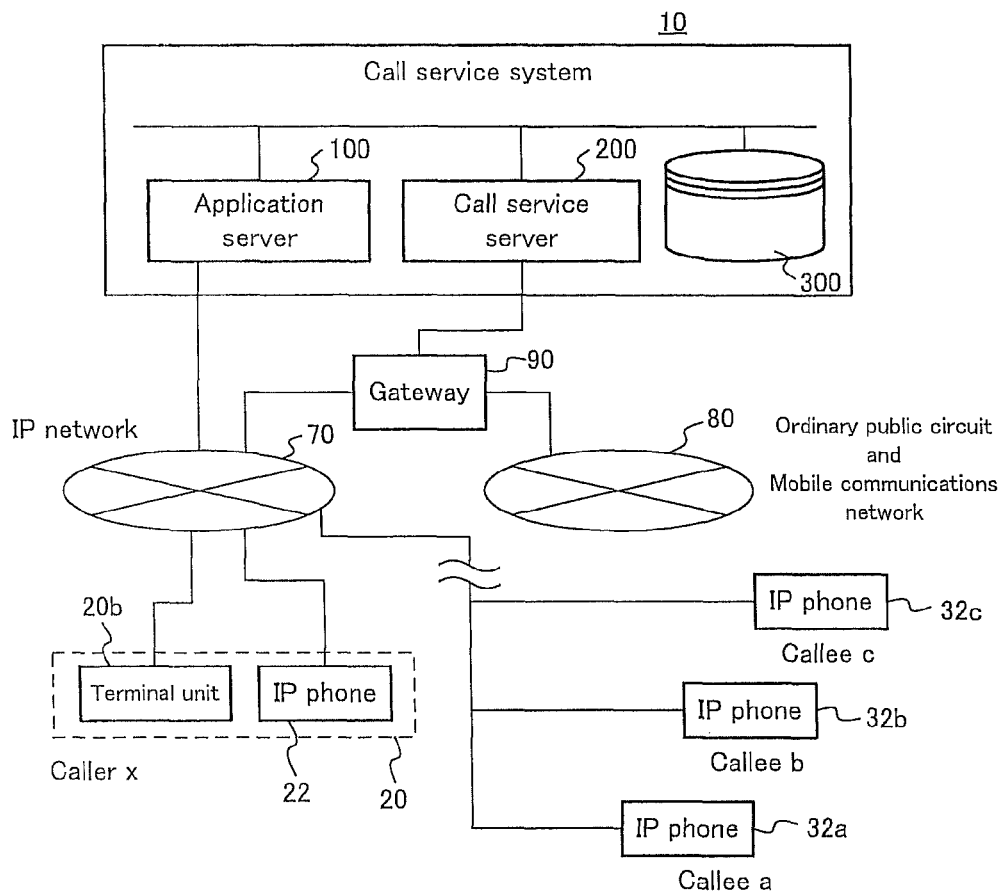
[FIG. 25] A block diagram showing the modification of the network containing the call service system in the 4th and 5th embodiments.

(Modification) In the case of the above 4th embodiment, even though caller x and callees a-c executed the telephone call using the telephone connected to the ordinary public circuit and the mobile communications network 80, those one side or both sides may be made the call over the telephone using the IP phone which carries the voice call by the Internet protocol. FIG. 25 is the block diagram showing the network when caller x and callees a-c use the IP phone.

In the example of FIG. 25, the IP phone machine 22 which caller x uses is connected to IP network 70, and the IP phone machine 32 (*a, b, c*--) which callees a-c uses is connected to IP network 70. In this case, the call from the call service server 200 is sent to IP phone 32 *a-c* which IP phone 22 and callees (a, b, c--) which caller x uses use via IP network 70, basic control management is executed like the above example.

(Operation effect) According to this embodiment described above, for example, in cases where the participant at the conference call is made into the group, when the call person (caller x) of the meeting carries the call request, after the callee voice call session to the participant (callees a-c) called to the conference room is settled, the caller voice call session with the caller is settled, and he is trying to bridge both the voice call session.

In order to convene the participant particularly using calling telephone number indigenous to each conference room, the call person's telephone number is not known by the participant. In order that calling telephone number is indigenous to each conference room, by informing and convening calling telephone number, the participant can know previously whether which conference room is convening.

[5th embodiment] Next, a 5th embodiment of the call control of the call service system 10 is described. In the case of the present embodiment, the case where the call control system of the present invention is applied to the support service in the customer center 310 is explained.

Figure 22:
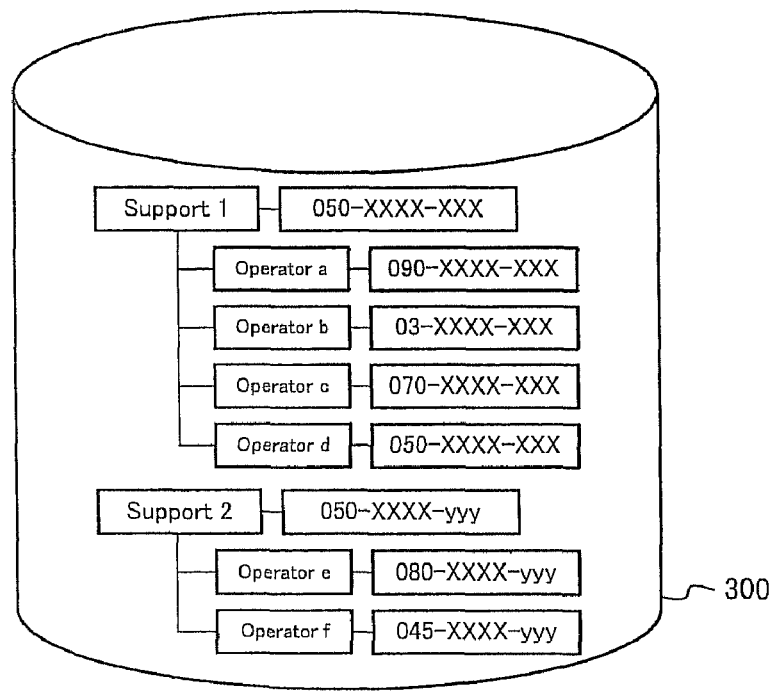
[FIG. 22] A explanatory view showing the data structure of the user database in a 5th embodiment.

In this embodiment, the user database 300 makes the group classification of the support which the customer center 310 concerned provides, as shown in FIG. 22, calling telephone number (050-xxxx-xxxx) indigenous in each group and the telephone number of the telephone terminal of the operators a-f which provide each support services (the support 1, the support 2, etc.) are related and memorized. As this classification of the support 1 or 2, For example, the classification related to the kinds, such as the inquiry for every product, the way and repair to be used, upgrade, can be considered, those who have the technical knowledge according to the classification of each support as an operator are registered. The whereabouts of the operator does not have to be carried out to the customer center, for example, even if at home by registering the telephone numbers, such as the individual cellular phone and the house fixed-line telephone, can be engaged in this service.

And in this embodiment, perform call processing all at once to telephone terminals of a plurality of operators (callees) belonging to the group of the support, and makes the callee voice call session settle only to a telephone terminal of a callee which answered first.

Figure 23:
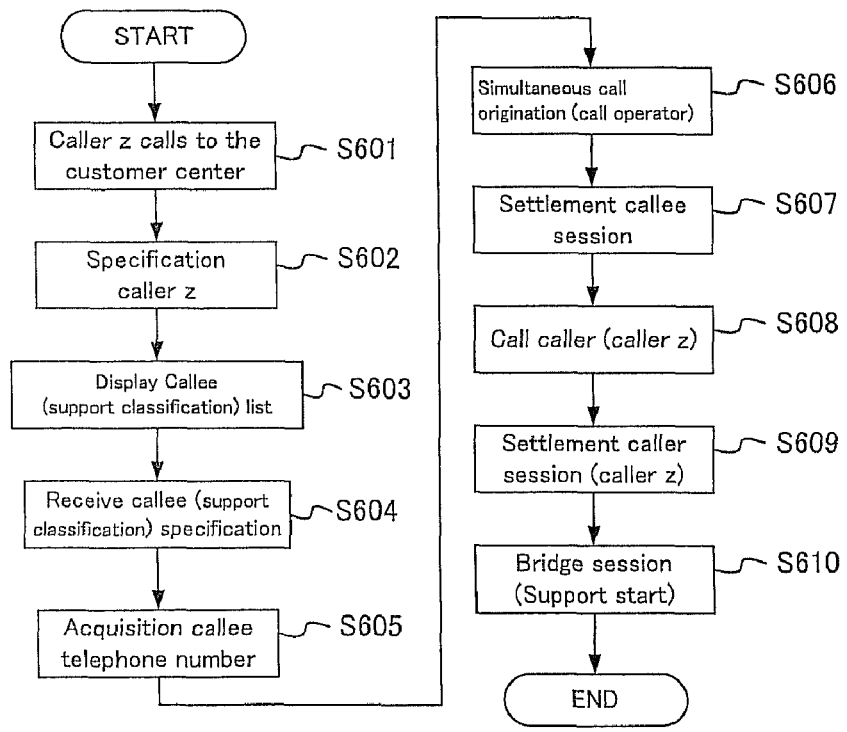
[FIG. 23] A flow chart explaining the call control of the call service system in a 5th embodiment.

(Call control method) The call control method of the present invention can be enforced by operating the call service system 10 which has the above composition. FIG. 23 is the flow chart explaining the call control of the call service system 10. In the case of the present embodiment, the call control of the call service system 10 is explained for the case where caller z receives support service from the customer center 310 using the cellular phone 20 having the function of the terminal unit 20b, and the function of the telephone 20a, as an example.

This processing is started because the call service system 10 accesses the customer center from the cellular phone 20 of caller z (S601). At this point, the user z may access the telephone number indigenous in the support classification by the call, when knowing the telephone number for every support previously, or may access on the Web page by the IP network 70 course.

When the access from cellular phone 20 of caller z is accepted, application section 120 specifies caller z (S602). Specification of caller z can be carried by referring to the user database 300, for example using the identification information (telephone number) of the cellular phone 20 received at the time of access. Or it may be made to specify caller z by carrying authenticating processing with the use ID or the password on the Web page, and accepting the input of identification information from caller z. By specifying caller z, the telephone number of the cellular phone 20 of caller z can also be specified.

When caller z is specified, with reference to the user database 300, caller z will create the list of available supports (callee), and will show caller z the application section 120 via the Web function section 110 (S603). When the user's access is based on the telephone call, the voice guidance can carry presentation of this list.

And operator a-d is contained in each support classification as the member, for example, by selecting support classification, simultaneous call origination will be carried to the operator belonging to the group of each support classification. That is, when specification of the support is accepted as a callee from caller z (S604), the application section 120 acquires the calling telephone number of the support, and the telephone number of telephone 310 a-f of operator a-f which is the callee with reference to the user database 300 (S605). And in the call service server 200, calling telephone number is informed as caller information, the telephone number of telephone 30 a-f of operator a-f is informed as callee information, and the call control request is carried.

In the call service server 200 which received the call control request, first, call callee sections 222 call at once to the telephone number of the operator (callee) informed as callee information (S606). In cases where it receives this call, it shifted and that operator answers, the callee voice call session is settled between the earliest operator and calling telephone number (S607).

And the call caller section 221 verifies that the callee voice call session has been settled, and calls using calling telephone number to the telephone number of the cellular phone 20 of caller z informed as caller information (S608). When the cellular phone 20 of caller z answers to this call, the caller voice call session will be settled between the caller terminal of calling telephone number, and the cellular phone 20 of caller z (S609). Subsequently, when the caller voice call session is settled, the bridge processing section 223 bridges the callee voice call session and the caller voice call session (S610). Thereby, the voice call can be carried now between the cellular phone 20 of caller z, and the operator.

Thus, when caller z accesses the customer center, it is in the case of the present embodiment, after the callee voice call session with the operator is settled, the caller voice call session with caller z is settled, both the voice call session is bridged, and support service is started. Therefore, when receiving support service, while the situation where the session was settled is held up, it can prevent caller z continuing waiting for the response of the operator.

Figure 24:
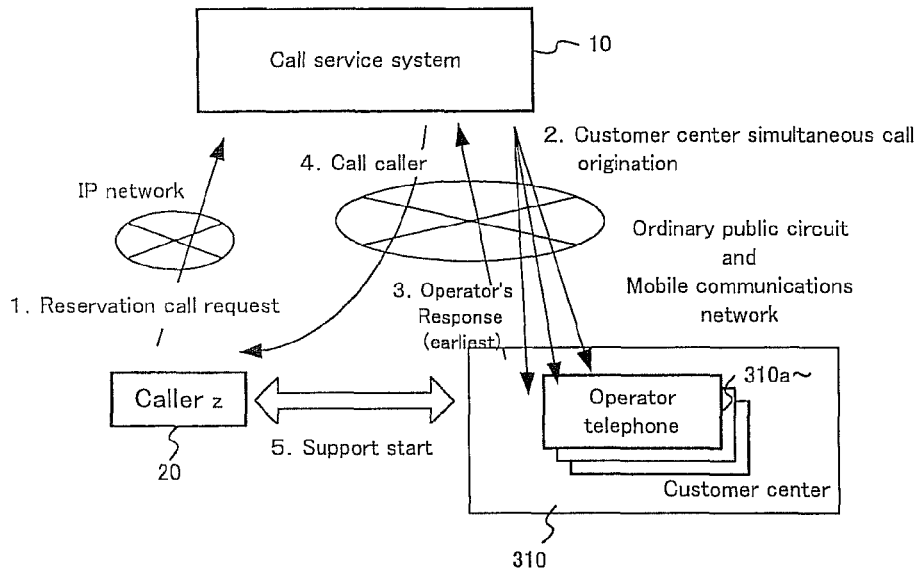
[FIG. 24] A figure showing the flow of processing of a 5st embodiment typically.

FIG. 24 is the figure showing the flow of processing concerning this embodiment typically. As shown in this figure, access is made by the call service system 10 via IP network 70 from the cellular phone 20 of caller z, and the call request to the operator of support service is sent. Depending on this call request, the call service system 10 carries simultaneous call origination via the ordinary public circuit and the mobile communications network 80 to telephone 310 a-d of operator a-d first.

And, in cases where one of the operators answers, the callee voice call session is settled between the call service system 10 and its operator. In cases where a plurality of operators answers, the callee voice call session is settled between the earliest operators.

Subsequently, after the telephone call session with this operator is settled, the call is executed via the ordinary public circuit and the mobile communications network 80 to the cellular phone 20 of caller z. Next, when the caller voice call session is settled between the call service system 10 and the cellular phone 20 of caller z, the call service system 10 bridges the callee voice call session and the caller voice call session. Thereby, offer of support service is started, while it has been in the state which the caller voice call session settled, without caller z is kept waiting, the voice call becomes available between the cellular phone 20 of caller z, and telephone 310 a-d of the operator.

In addition, the result made to call from one of the communication terminals 230 to the telephone number of telephone 310 a-f of the operator by processing (S606), in cases where the callee voice session is not able to be settled by unresponsive of the operator, it is advisable to inform that to the cellular phone 20 of caller z. Thereby, caller z does not need to continue waiting for receipt.

Some or all of the function of the application server 100 may be installed in the cellular phone 20 as application software. In this case, some or all of processing that is executed by the application server 100 is executed on the cellular phone 20, and that processing result can realize the above-mentioned call control processing similarly by receiving the call service server 200 from the cellular phone 20.

(Modification) In the case of the above 5th Embodiment, Even though caller x and the operators a-d are made the call over the telephone using the telephone connected to the ordinary public circuit and the mobile communications network 80, as shown in FIG. 25, the user, one side of the operator, or both sides may be made the call over the telephone using the IP phone which carries the voice call by the Internet protocol.

In the example of FIG. 25, the IP phone machine 22 which caller x uses is connected to IP network 70, and the IP phone machine 32 (a, b, c--) which the operator (callee) uses is connected to IP network 70. In this case, the call from the call service server 200 is sent to IP phone 32 which IP phone 22 and operator which caller z uses use via IP network 70, basic control management is executed like the above example.

(Operation effect) According to this embodiment described above, calling telephone number was set up for every classification of the support in the customer service center, in order that the callee voice call session with the operator which the calls were made at once to the operator and answered earliest when the caller which is going to receive the support telephoned the calling telephone number according to the classification of the support to demand is settled, once the user x of the caller sends to the telephone number of the arbitrary supports, he does not need to continue calling and should just wait for the call-back when the operator answers until the operator answers.

Reference Signs List
A—Caller
B—Callee
C-E—User
10—Call service system
20—Cellular phone
20a—Telephone
20b—Terminal unit
22—IP phone machine (caller)
30, 30a-30c—Telephone
32 (a, b, c--)—IP phone machine (callee)
41-44—Callee list display screen
41a, 42a, 43a, 44a, 46a—The callee list display column
42b, 44b, 46b—The telephone call reservation appointed field
43b, 44c—The priority appointed field
45, 46—Callee list display screen
70—IP network
80—The ordinary public circuit and mobile communications network
90—Gateway
100—Application server
110—Web function section
120—Application section
121—Reservation call processing section
122—Priority processing section
130—User's information storage section
200—Call service server
210—Interface section
220—Call control section
221—Call caller section
222—Call callee section
223—Bridge processing section
224—Security management section
230—Communication terminal
300—User database
310—Customer center
310a—Telephone (operator)

The invention claimed is:

1. A call control system for connecting to a callee from a caller for a phone call comprising:
a connection request receive section for receiving a connection request that contains a telephone number of a telephone terminal of the caller and a telephone number of a telephone terminal of the callee, from the caller to the callee, from an information terminal equipment of the caller;
a call callee section for calling to the telephone terminal of the callee, and then settling a callee voice call session to the telephone terminal of the callee;
a call caller section for calling to a telephone terminal of the caller, and settling a caller voice call session to a telephone terminal of the caller after the callee voice call session is settled; and
a bridge processing section settling a voice call between the telephone terminal of the caller, and the telephone terminal of the callee by bridging the callee voice call session and the caller voice call session, wherein
the call callee section is connected a plurality of communication terminals which each has a peculiar telephone number assigned, and calls to the telephone terminal of the callees, from the communication terminal by dialing the assigned telephone number for settling a callee voice call session between the communication terminal and the telephone terminal of the callee, and
the call caller section is connected a plurality of communication terminals which each has a peculiar telephone number assigned, and calls to the telephone terminal of the callers, from the communication terminal by dialing the assigned telephone number for settling a caller voice call session between the communication terminal and the telephone terminal of the caller.

2. The call control system as claimed in claim 1 wherein the connection request contains the call reservation time to start the call processing to the callee, and
the reservation call processing section executes the call to the telephone terminal of the callee, and settles the callee voice call session to the telephone terminal of the callee at the telephone call reservation time.

3. The call control system as claimed in claim 1 wherein the connection request includes specification of a priority of call processing to the callee,
the call callee section is connected to
a priority processing section for calling to the telephone terminal of the callees according to the correspondency of the priority set previously and the telephone number from the communication terminal to which the telephone number corresponding to the appointed priority is assigned.

4. A call control method for connecting to a callee from a caller for a phone call comprising:
  a connection request receiving step for receiving a connection request that contains a telephone number of a telephone terminal of the caller and a telephone number of a telephone terminal of the callee to the callee, from the caller, from information terminal equipment of the caller;
  a call callee step for calling to the telephone terminal of the callee, and then settling a callee voice call session to a telephone terminal of the callee;
  a call caller step for calling to the telephone terminal of the caller, and settling a caller voice call session to a telephone terminal of the caller after the callee voice call session is settled; and
  a bridge processing step for settling a voice call between a telephone terminal of the caller, and a telephone terminal of the callee by bridging the callee voice call session and the caller voice call session, wherein,
  in the call callee step, the callee voice call session is performed through a plurality of communication terminals which each has a peculiar telephone number assigned, and then the assigned telephone number is dialed to the telephone terminal of the callees from the communication terminal for settling a callee voice call session between the communication terminal and the telephone terminal of the callee,
  in the call caller step, the caller voice call session is performed through a plurality of communication terminals which each has a peculiar telephone number assigned, and then the assigned telephone number is dialed to the telephone terminal of the callers from the communication terminal for settling a callee voice call session between the communication terminal and the telephone terminal of the caller.

5. The call control method as claimed in claim 4 wherein
  the connection request contains the call reservation time to start the call processing to the callee, and
  a reservation call processing for executing the call to a telephone terminal of the callee, and settling a callee voice call session to a telephone terminal of the callee at the telephone call reservation time is included in the call callee step.

6. The call control method as claimed in claim 4 wherein
  the connection request includes specification of a priority of call processing to the callee, and
  the call callee step contains a priority processing for calling to the telephone terminal of the callees according to the correspondency of the priority set previously and the telephone number from the communication terminals to which the telephone number corresponding to the appointed priority is assigned.

7. A call control system for connecting with a group constituted by a plurality of users depending on operation of a caller comprising:
  a user database for storing a telephone number for calls peculiar to the group, and a telephone number of a telephone terminal of a callee as a user belonging to this group after associating them;
  a connection request receiving section for receiving a connection request required to the callee including the calling telephone number and a telephone number of a telephone terminal of the callee, from information terminal equipment of the caller;
  a call callee section for calling of the calling telephone number peculiar to the group, to a telephone terminal of the callee as a telephone number of a caller, and settling one or more callee voice call sessions to a telephone terminal of the callee;
  a call caller section for dialing the calling telephone number peculiar to the group, to a telephone terminal of the caller as a telephone number of a caller, and settling a caller voice call session settle to a telephone terminal of the caller, after the at least one callee voice call session is settled; and
  a bridge processing section for settling a voice call between a telephone terminal of the caller, and a telephone terminal of the callee by bridging the one or more callee voice call sessions and the caller voice call session, wherein,
  the call callee section is connected to a plurality of communication terminals which has the telephone number peculiar to the group is each assigned for the call, and calls to the telephone terminal of the callees from the communication terminal by dialing the assigned telephone number for settling a callee voice call session between the communication terminal and the telephone terminal of the callee, and
  the call caller section is connected to a plurality of communication terminals which has the telephone number peculiar to the group is each assigned for the call, and calls to the telephone terminal of the callers, from the communication terminal by dialing the assigned telephone number for settling a caller voice call session between the communication terminal and the telephone terminal of the caller.

8. The call control system as claimed in claim 7 wherein
  the connection request contains the call reservation time to start the call processing to the callee, and
  a reservation call processing section for executing the call to a telephone terminal of the callee at the call reservation time is connected to the call callee section.

9. The call control system as claimed in claim 7 wherein
  the call callee section performs call processing all at once to telephone terminals of a plurality of callees belonging to the group, and makes the callee voice call session settle only to a telephone terminal of a callee who answered first.

10. A call control method for connecting with a group constituted by a plurality of users depending on operation of a caller comprising:
  a store step for storing previously, in association with each other, calling telephone number peculiar to the group, and a telephone number of a telephone terminal of a callee belong to the group in a user database after associating them;
  a connection request receiving step for receiving a connection request required to the callee including the calling telephone number and a telephone number of a telephone terminal of the callee, from information terminal equipment of the caller;
  a call callee step for dialing the calling telephone number peculiar to the group, to a telephone terminal of the callee as a telephone number of a caller, and settling one or more callee voice call sessions settle to a telephone terminal of the callee;
  a call caller step for dialing the calling telephone number peculiar to the group, to a telephone terminal of the caller as a telephone number of a caller, and settling a caller voice call session settle to a telephone terminal of the caller, after the at least one callee voice call session is settled; and a bridge processing step for settling a voice call between a telephone terminal of the caller, and a telephone terminal of the callee settle by bridging the one or more callee voice call sessions and the caller voice call session, wherein, in the call callee step, the callee voice call session is performed through a plurality of communication terminals which has the telephone number peculiar to the group is each assigned, and then the assigned telephone number is dialed to the telephone terminal of the callees from the communication terminal for settling a callee voice call session between the communication terminal and the telephone terminal of the callee, in the call caller step, the caller voice call session is performed through a plurality of communication terminals which has the telephone number peculiar to the group is each assigned, and then the assigned telephone number is dialed to the telephone terminal of the callers from the communication terminal for settling a callee voice call session between the communication terminal and the telephone terminal of the caller.

11. The call control method as claimed in claim 10 wherein the connection request contains the call reservation time which starts the call processing to the callee, and the call callee step contains a reservation call processing step which executes the call to a telephone terminal of the callee at the call reservation time.

12. The call control method as claimed in claim 10 wherein the call callee step performs call processing all at once to telephone terminals of a plurality of callees belonging to the group, and makes the callee voice call session settle only to a telephone terminal of a callee which answered first.

* * * * *